(12) United States Patent
Saadat

(10) Patent No.: US 11,518,046 B2
(45) Date of Patent: Dec. 6, 2022

(54) MULTI-FUNCTIONAL LONG ARM GRIPPING MECHANISM

(71) Applicant: KIMIYA GMBH, Soest (DE)

(72) Inventor: Mohammad Mohsen Saadat, Soest (DE)

(73) Assignee: Kimiya, GmbH, Soest (DE)

(*) Notice: Subject to any disclaimer, the term of this patent is extended or adjusted under 35 U.S.C. 154(b) by 0 days.

(21) Appl. No.: 16/760,885

(22) PCT Filed: Sep. 3, 2019

(86) PCT No.: PCT/EP2019/073471
§ 371 (c)(1),
(2) Date: Apr. 30, 2020

(87) PCT Pub. No.: WO2020/048985
PCT Pub. Date: Mar. 12, 2020

(65) Prior Publication Data
US 2021/0178607 A1    Jun. 17, 2021

(30) Foreign Application Priority Data
Sep. 4, 2018  (DE) .................. 10 2018 006 991.6

(51) Int. Cl.
*B25J 15/04* (2006.01)
*B25J 15/06* (2006.01)

(52) U.S. Cl.
CPC .......... *B25J 15/045* (2013.01); *B25J 15/0608* (2013.01); *B25J 15/0616* (2013.01)

(58) Field of Classification Search
CPC ...... B25J 15/0047; B25J 15/02; B25J 15/045; B25J 15/0608; B25J 15/0616; B25J 15/08; B25J 15/10; B25J 15/0206; B25J 15/0286
(Continued)

(56) References Cited

U.S. PATENT DOCUMENTS

2003/0075941 A1* 4/2003 McIntosh ............. B25J 15/0052
                                                                    294/197
2016/0339590 A1  11/2016 Lin et al.
(Continued)

FOREIGN PATENT DOCUMENTS

CN       106003112 A     10/2016
DE    102009015977 A1     9/2010
(Continued)

OTHER PUBLICATIONS

Written Opinion and International Search Report dated Jan. 3, 2020 for International Patent Application No. PCT/EP2019/073471.
(Continued)

*Primary Examiner* — Paul T Chin
(74) *Attorney, Agent, or Firm* — Browdy and Neimark, P.L.L.C.

(57) ABSTRACT

A slim and long multifunctional gripping mechanism has a bending- and torsion-resistant structure, on which several finger, suction, magnetic head and other mechanisms for a multitude of tasks are arranged. The gripper arm is composed in sandwich configuration of several cages placed on top of each other, like a multi-stage tower. The individual cages consist of two plates in parallel in lightweight construction, with their mutual distance being ensured by several rods, spokes, wires, ropes and strings. Most of the drives are contained within the first cage after the flange. From that position, all mechanisms participating in the action of the gripper are driven by rods, shafts, ropes, chains or belts traversing the cages. Further cages are used to attach and accommodate the components of finger mechanisms. Movable cages are used as drives for finger, suction or magnetic head mechanisms. Several finger mechanisms perform a different task each.

16 Claims, 30 Drawing Sheets

(58) Field of Classification Search
USPC .......................................................... 294/192
See application file for complete search history.

(56) References Cited

U.S. PATENT DOCUMENTS

| | | |
|---|---|---|
| 2017/0151678 A1 | 6/2017 | Li et al. |
| 2019/0168396 A1* | 6/2019 | Leidenfrost ............ B25J 15/106 |
| 2020/0024853 A1* | 1/2020 | Furrer .................. B25J 15/0019 |
| 2020/0353629 A1* | 11/2020 | Simons .................... B25J 9/144 |
| 2021/0337734 A1* | 11/2021 | Jeanty .................... B65G 47/91 |

FOREIGN PATENT DOCUMENTS

| | | |
|---|---|---|
| DE | 102016010190 A1 | 3/2017 |
| DE | 102016220643 A1 | 4/2018 |

OTHER PUBLICATIONS

GMG Gesellschaft Fi.ir Modulare Greifersysteme Mbh. "Modularer Langarmgreifer" 1-9, D-59494 Soest, Feb. 18, 2019 (Feb. 18, 2019) Retrieved from the Internet: http://www.gmg-system.com/media/i 105 technisches_datenblatt.pdf [retrieved on Nov. 29, 2019] XP055647961, the whole document.

GMG Gesellschaft fi.ir Modulate Greifersysteme. "Langarmgreifer I 105" 1-9, Youtube, Dec. 20, 2018 (Dec. 20, 2018), p. 2 pp., Retrieved from the Internet: https://youtu.be/dlTKkOq6PW4 fetrieved on [Dec. 13, 2019], XP054980048, the whole document.

\* cited by examiner

MULTI-FUNCTIONAL LONG ARM GRIPPING MECHANISM

This application claims priority to International Patent Application No. PCT/EP2019/073471 (published as WO/2020/048985 on Mar. 12, 2020) with an international filing date of Sep. 3, 2019, which claims priority to 10 2018 006 991.6 (DE) filed on Sep. 4, 2018, the contents of each which are incorporated herein in their entirety by reference.

The invention described in this document represents a multifunctional long arm gripping mechanism for robots, machines and handling equipment with at least one movable gripping finger, working together with another fixed or movable gripper finger.

In retracted position, the gripper has a slim long shape, cylindrical or polygonal. Over its entire length—amounting up to several meters—this body is able to deeply penetrate into hollow spaces, grasp objects or workpieces, one by one or together, to transport them from A to B, and then to place them at the intended position one by one or together. For this reason, the mechanism—for removal or placing of parts may also grasp deeply into corners of a crate without contacting the crate walls. Thanks to its multifunctional design, the gripper may be equipped with several fingers, suction or magnetic head mechanisms to combine several tasks and to carry them out simultaneously or in a sequence.

BACKGROUND OF THE INVENTION

Numerous universal gripping mechanisms are available on the markets, and a multitude of gripping mechanisms for particular tasks exists as well. In a situation however requiring products from an industrial process to be placed in a dense configuration (beside or on top of each other) into deep crates—e.g. during production, transport or storage— or to retrieve them from these positions at a later stage, these mechanisms are not very appropriate, as they may come into contact with an adjacent part or the wall of the box meanwhile.

DE 10 2016 220 643 A1 shows a robot gripper (1) of an identical product family with a gripper base body (2) equipped with at least one radially movable gripper top jaw (10) and an auxiliary suction element (13). The gripper features a central suction element, attached to the end of a tube-shaped column (17) adjustable in height. The drives (14 and 15) are mounted on a plate, which is installed to the base body (2) by means of three laterally placed square bars and forming a cage. Within this cage, guide rods (not described in detail) are provided, on which a plate slides up and down, acting as a drive for gripping arms. This robot gripper is fixed to the gripper flange (3) by means of a narrow connecting element not described in detail.

The entire weight, bending and torsional moment of the robot gripper together with the grasped object itself act on the narrow connecting element between gripper base body (2) and gripper flange (3), not described in detail. Furthermore, in any position, the three gripper arms (9.1, 9.2 and 9.3) are radially protruding towards outside and always remain in a large diameter far outside the cage-shaped construction, even when handling very small objects.

CN 106 003 112 A describes a gripping mechanism with a very large gripper range. Linkages used in this case are based on mechanisms like scissor linkage and isosceles centric slider-crank mechanism with a central sliding rod (1), which acts as frame for the mechanisms and is connected to the flange. Due to this sole and very weak connection, the load carrying capacity of the large gripper is considerably restricted with respect to bending and torsional moment.

US 2017/0 151 678 A1 describes a gripping mechanism with up to four gripper fingers at the end of three components mounted on top of each other, made from the solid material with a massive construction. This gripping mechanism is based on a shaft as attachment to the machine, becoming broader and heavier towards the tip of the gripper. This design is absolutely not appropriate for extremely long, rigid and torsion-resistant gripper mechanisms.

DE 10 2009 015 977 A1 describes a robot arm consisting of three flexible rods, comprising in longitudinal direction stages of triangular-shaped rods used to maintain the mutual distance of the flexible rods. By shortening the length of individual flexible rods, the gripper flange is inclined, together with a gripper at the top of the flexible rods, on a surface curved in space. This robot arm is very torsion-flexible.

SUMMARY

The purpose of the invention detailed in the following, consists in the task of designing a multi-functional gripper mechanism with extremely long arm and large gripping range, still remaining very slim and narrow in retracted state, and simultaneously offering high rigidity and torsional strength.

The invention solves this task by means of the features described in the independents claims.

Dependent claims represent beneficial further developments of the invention.

The gripper mechanism basic for the invention is intended for robots, machines and handling equipment, and features an extremely long arm and at least one moveable gripping finger, acting in a coordinated manner together with another fixed or movable gripper finger. The case of the gripping mechanism is composed of a (particularly slim) multi-stage tower in sandwich construction made of at least two cages (I and II) located above the gripper flange, with two fixed cage plates; with the mutual distance being maintained by rods, spokes, ropes and/or wires. In retracted state, the actuators and (particularly preferred) all movable components of the gripper are located preferably at least mainly, nearly completely or completely within the cages.

The arm, respectively the long arm of the gripper mechanism, comprises the case in form of the particularly slim tower, respectively the arm is made available by the case at least partially or completely. The tower may preferably be called gripper tower.

The term "slim" tower within the sense of this application defines a tower-shaped structure with a relation between maximum longitudinal dimension and diameter exceeding 2:1 in at least one intended state, particularly larger than or equal to 3:1, and achieving or exceeding values of 4:1. A relation exceeding 2.5:1 is specially preferred.

All movable parts or actuators are considered to be mainly located within the cages, when they are located within the cages at least at one of the available positions to more than 50%, particularly to more than 60%, preferably to more than 70% or 80%. It is also possible and preferred that that all movable parts or actuators are located within the cages to more than 90%, especially more than 95%, almost or even exactly 100%.

Within the sense of this application, a part or actuator is particularly considered to be located within a cage, when the part or actuator is located within a cylindrical, oval or polygonal cage volume defined by the elements of the cage, as narrow as possible.

In basic configuration, the gripping mechanism representing the invention features a long arm as case in form of a slim tower, called gripper tower, consisting of at least one flange and two levels above the flange mounted on top of each other, called cage plates, which in this combination and together with the flange, form a bending- and torsion-resistant cage. The numbering of the cage plates starts with the first cage plate following the flange plate. Several rods, spokes, ropes and wires at one end are installed to the flange plate. Their other end is attached to a second plate located in parallel to the flange plate at a certain distance. Together with the second plate and the intermediate rods, spokes, ropes or wires (whether in parallel or mutually crossing), the flange plate forms a lightweight, bending- and torsion-resistant cage: The flange cage. The hollow space of this flange cage is intended essentially for accommodation of actuators, mechanisms, and other elements and components as well as of modules for electronics and control of the gripper. Furthermore, the flange cage may be used as extension of the arm.

The interfaces to the arm (energy and material supply and communication by signals) are provided in form of plugs and couplings at the flange plate, preferably at the periphery of the round flange or close to the flange plate, or traversing the flange plate.

The bodies respectively cases of actuators, electric motors, pneumatic cylinders and other drive components or other machine elements are installed in one or several cages between their cage plates, which for their part reinforce the gripper tower and thus the whole gripper arm. Two types of cages plates and cages are provided: Fixed and movable. Both cage types feature cage plates and cage rods. Fixed as well as movable cage plates are used to maintain the mutual distances of the rods, acting as protection against bending and reinforcing them with respect to kinking and torsion.

The cage plates may be fixed at either one or both sides by the rods, spokes etc. Machine elements and actuators located between the cage plates may be subjected to a certain pressure, in order to stretch rods, spokes, ropes, wires or strings.

Alternatively, between the cage plates of individual cages, rods or tubes (preferably subdivided elements) have to be placed, pushed apart from each other by a screw connection, in order to apply pre-stress to exterior rods, wires, ropes or strings.

The rods of the cages are normally also used as guide rods of the prismatic joints between movable cage plates and fixed cage rods as well as the prismatic joints between fixed cage plates and movable cage rods. The movable cage rods may also pass through the fixed cage plates and form in this combination a prismatic joint. All of the rods may be tube-shaped (i.e. internally hollow).

All cage plates, whether fixed or movable, may comprise fasteners for joints. This means that actuators may be attached to the cage plates in fixed or movable configuration; this is also valid for joints of other mechanisms coupled to the multi-functional gripper mechanism. Cages, partially or as a whole, may be used as drive or driving element for individual or groups of finger mechanisms or other mechanisms.

Cage plates are round or polygonal with radial cut outs, honeycombed and with a lightweight design. Only the minimum material quantity is used, required to hold or clamp the fixed guide rods and the friction bearings for passing guide rods. Their external contours may be of any geometrical form, circular or polygonal. The center of the gripper tower and of the individual cages remains free from rods or spokes, in order to be able to place supply lines, finger mechanisms or other mechanisms on these positions. The rods and spokes are preferably positioned from the external border of the gripper tower radially towards the internal zone.

According to application and task, a slim tower of any length, lightweight but bending—and torsion-resistant, is composed by placing any number of cages on top on each other in sandwich configuration, to form a hollow arm and a frame for the multi-functional gripping mechanism. The perimeter of the individual cage plates, with increasing distance to the flange plate, preferably conically decreases. In retracted state, this design of a gripping mechanism is able to accommodate its gripper fingers, suction head, magnetic head and other mechanisms including actuators completely within its gripper tower, to deeply penetrate into corners of crates or hollow spaces of workpieces, grasp parts and perform its task and then to move out again.

Actuators generating forces or moments and other heavy components are accommodated within the first cages, close to the flange. Parts of mechanisms transmitting forces or performing guiding tasks like links or cranks, are normally located within cages far from the flange, attached or coupled to movable or fixed cage plates, performing their function and task, passing between rods, wires, ropes and strings towards the exterior of the gripper tower.

Actuation of movable cage plates and entire cages or driving or synchronization rings unilaterally guided on guide rods, takes place by means of the actuators installed inside the flange cage or other cages, mechanically by shafts, rods, ropes, spindles, chains, belts, strings, springs, pneumatic springs and similar driving elements, if required also passing through holes in intermediate cage plates.

Axial or helical movement of a movable cage plate or of a ring, on parallel rods or wires along the longitudinal axis of the gripper (A), is used as actuation and/or synchronization of the mechanisms participating in the gripper functions and other movable components.

According to the current task, the required number (one or several) of mechanisms are placed around the correspondingly designed gripper tower at different heights, activated individually or in groups, to perform different tasks one after the other or simultaneously. The mechanisms may consist of simple four-link bars up to multi-link kinematic chains with several drive and output links.

It is for instance possible to design a configuration with three synchronously working finger mechanisms grasping and handling an object from inside or outside, with three suction mechanisms meanwhile in retracted state in standby mode. As soon as a complete layer of parts has been positioned on the required area, the finger mechanisms completely move back into the gripper tower, and the three suction mechanisms are activated. They move out and aspirate a layer of cardboard to place it as intermediate layer on the top of the parts.

Another example: The gripper uses a group of three finger mechanisms to grasp a first part, moves by robot onto a second (completely different) part or onto an intermediate layer, and the corresponding item is grasped by a second group of finger mechanisms or aspirated by a suction mechanism. Then both items are placed together or one after the other on the intended position.

For applications with a large lateral force or torsion acting on the gripper or with the requirement of complete sealing of the gripping mechanism, the correspondingly designed gripping mechanism in retracted state is inserted into a tube, which disposes of an external diameter similar to the external diameter of the flange plate. The tube is attached in correct orientation to a step of the flange plate. The external tube jacket features windows, cut outs and slots at the positions at which gripper fingers, suction cups, magnetic heads and other mechanisms pass through. A lid of preferably conical shape locks the open front face of the tube, laterally holding in place the last cage plate by means of a step or a cone. This configuration ensures maximum bending—and torsion-resistance, so that even horizontal applications are possible. An elastic coating acts as envelope, covering the entire tube from the tip to the flange, ensuring waterproofness and tightness with respect to gas and chemicals, so that the long arm gripping mechanism is appropriate also for this kind of applications.

When viewing from the flange, the first and the fourth cage plate are mutually connected to a movable cage, by means of three additional rods. This cage runs by linear bearings on the guide rods, axially slidable, and is used as drive for many mechanisms of the gripper. The third cage plate is firmly connected to the flange, by means of three further guide rods passing through the second and the first cage plate up to the flange. Between second and third cage plate, an actuator is placed and firmly connected to both cage plates. The driving rod respectively driving shaft of this actuator is firmly connected to the fourth cage plate, and acts on this element to set it into motion.

Figure 22:
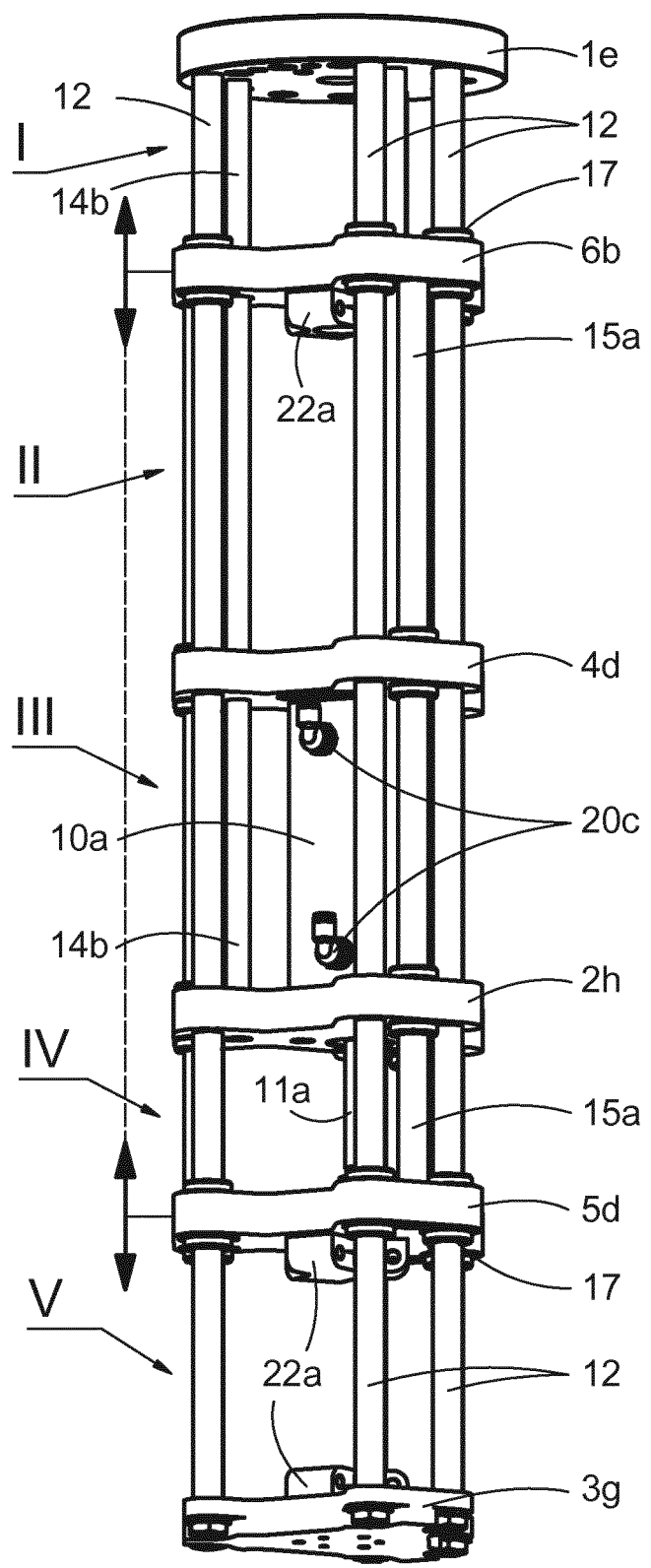
FIG. 22 A gripper tower as frame for another version of the multi-functional long arm gripping mechanism, consisting of a round flange plate, five trefoil-shaped cage plates and six guide rods, in three times double configuration traversing from the flange to the last cage plate.
Figure 23:
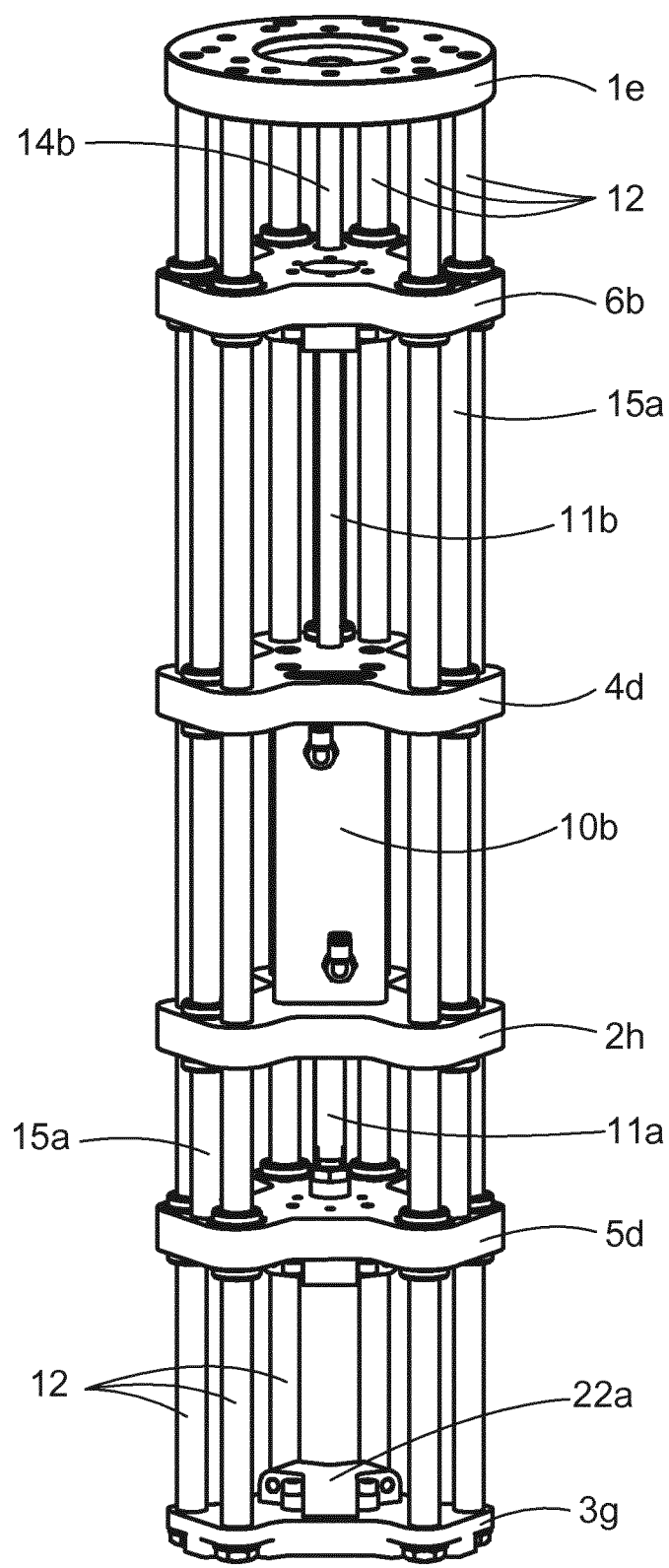

FIG. 23 The same gripper tower illustrated in FIG. 22, with an actuator. The driving rod, piston rod, rotor shaft or spindle drive of this actuator starts from the first, and passes through the second, the actuator and the third cage plate up to the fourth cage plate. Whereas on half of the driving rod is used for actuation of the cage, its second half is coupled to a distance measuring system and/or a brake system.

Figure 24:
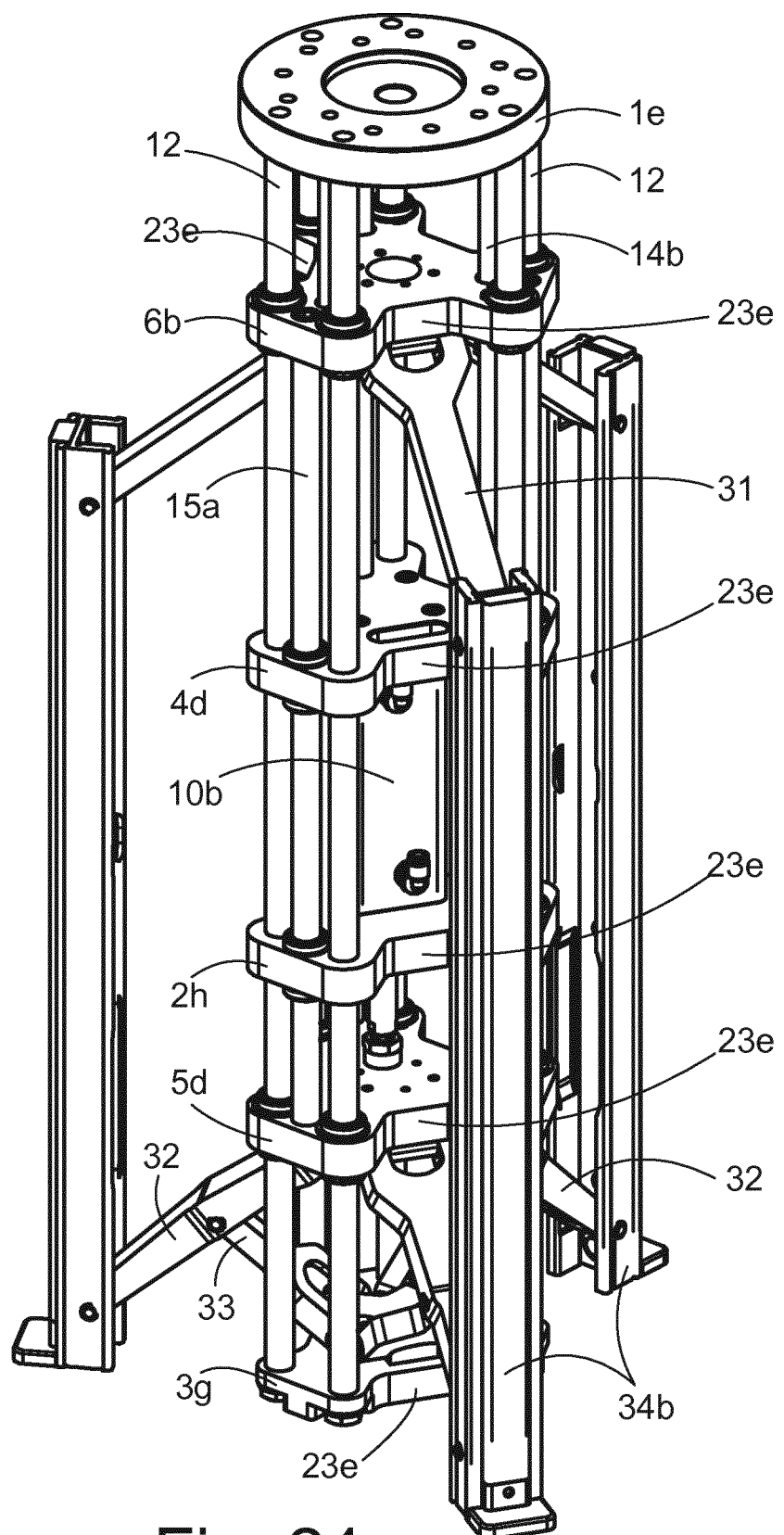

FIG. 24 A three-finger long arm gripper mechanism in half opened state. Its gripper housing is designed as slim tower according to FIG. 23.

Figure 25:
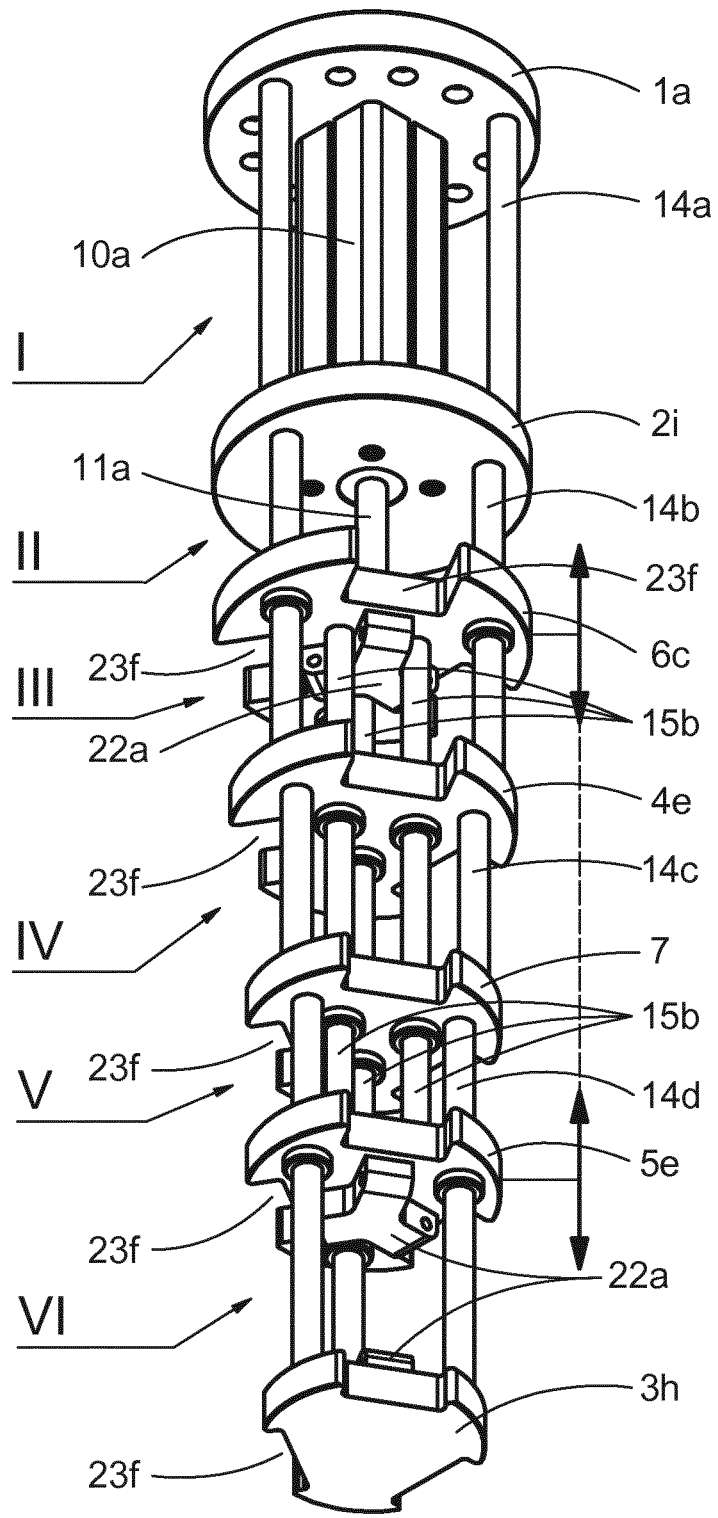

FIG. 25 The case of a multi-functional gripper mechanism in form of a multistage tower, consisting of a flange cage, three fixed cages located above the flange cage as well as a movable cage, with two cage plates. One of these cage plates is placed between the first and the third cage plate, the other one between the fourth and the sixth cage plate. The fixed cages feature three guide rods each. The movable cage disposes of three guide rods as well, which pass through the linear bearings of the third and the fourth cage plate. Additionally, the two movable cage plates numbers two and five run by the linear bearings on the guide rods of the fixed cages.

The cage plates dispose of both, 1) joint holes or joint brackets, for attachment of cranks, links, gripper fingers and other machine elements, 2) cut outs for accommodation of extendible parts and elements of the gripping mechanism.

Figure 26:
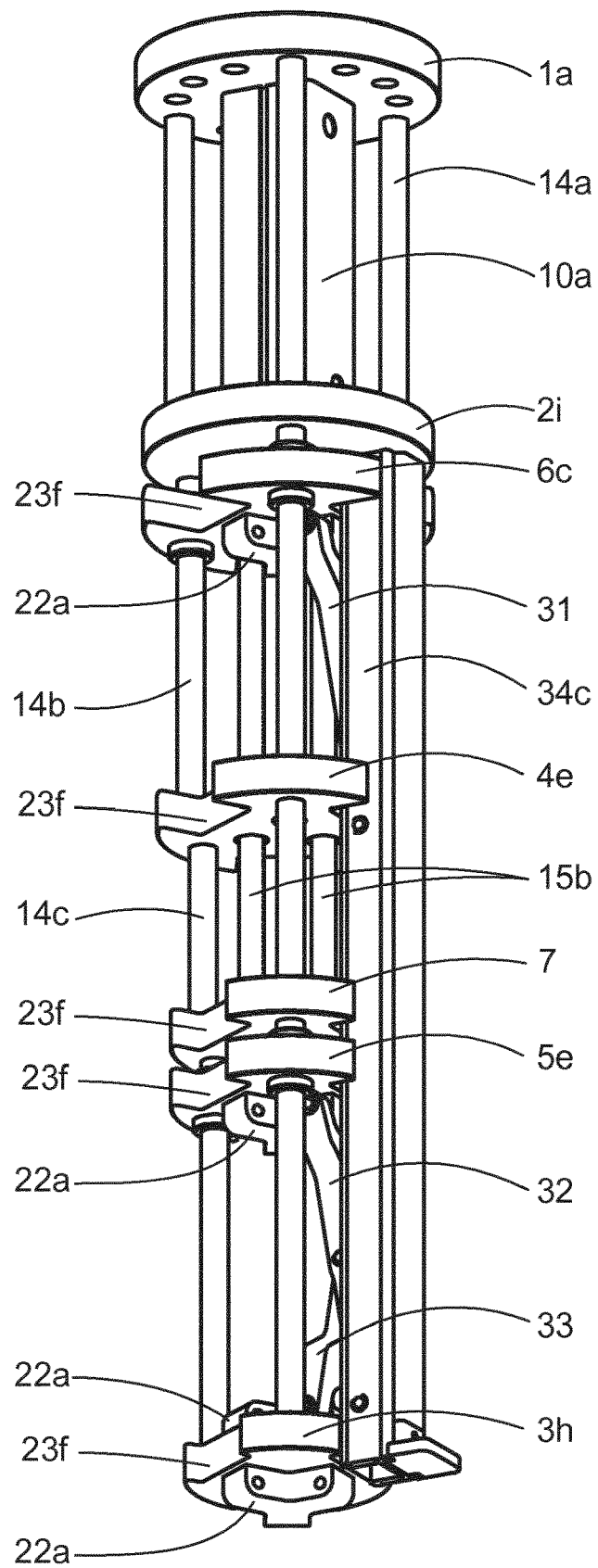

FIG. 26 Long arm gripping mechanism according to FIG. 25 with a six-link bar finger mechanism in retracted state. Two links of the finger mechanism are attached in a rotatable manner to the two synchronously movable cage plates numbers two and five. A crank links the lower link bar per swivel to the sixth cage plate.

Figure 27:
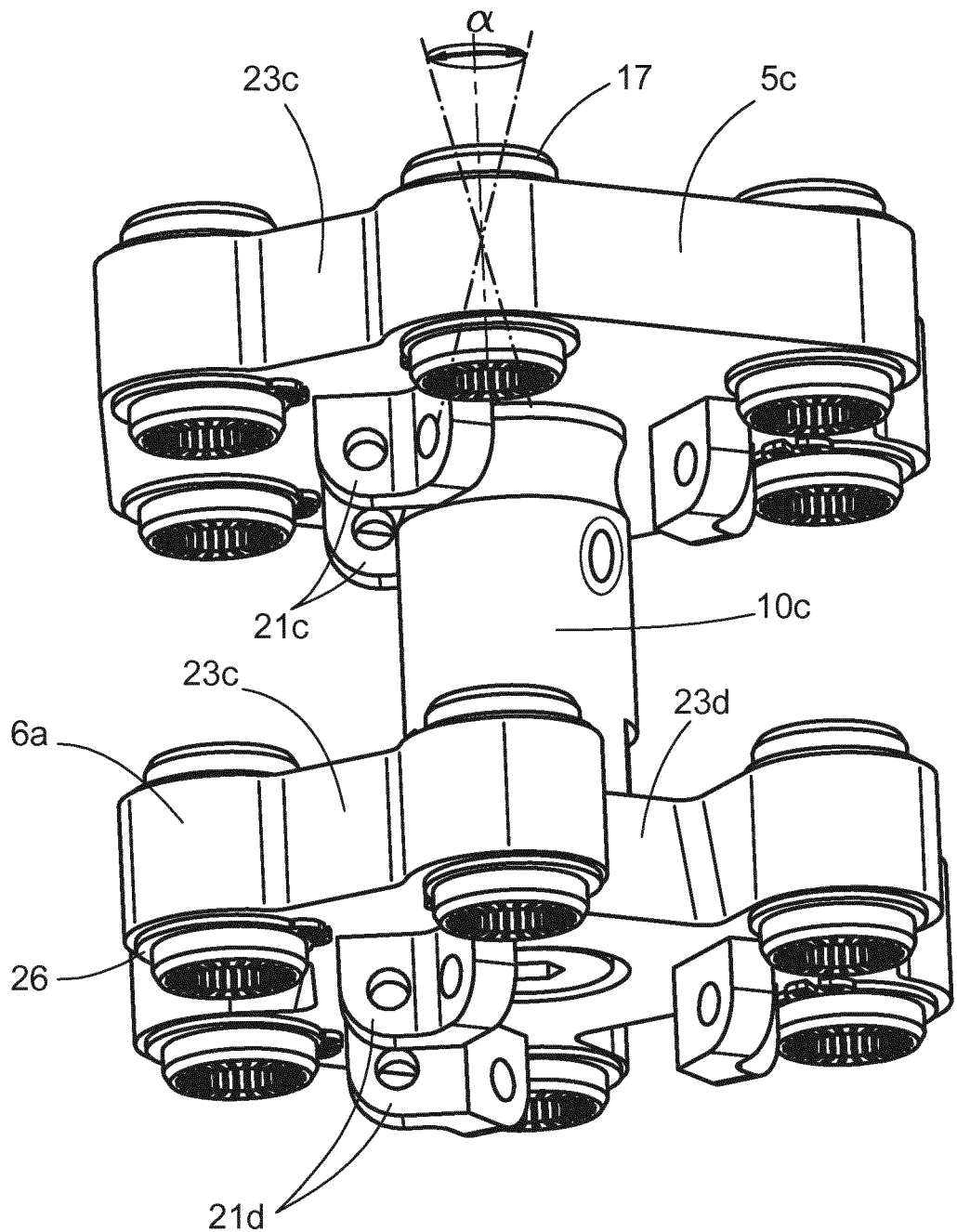

FIG. 27 Perspective view of two movable cage plates, mutually connected axially slidable. Their distance may be adjusted by means of an actuator e.g. a pneumatic cylinder or an electric motor and spindle drive. Both cage plates feature linear bearings for sliding motion on the guide rods, and brackets with holes for hinged attachment of link bars, actuators or other machine elements.

Figure 28:
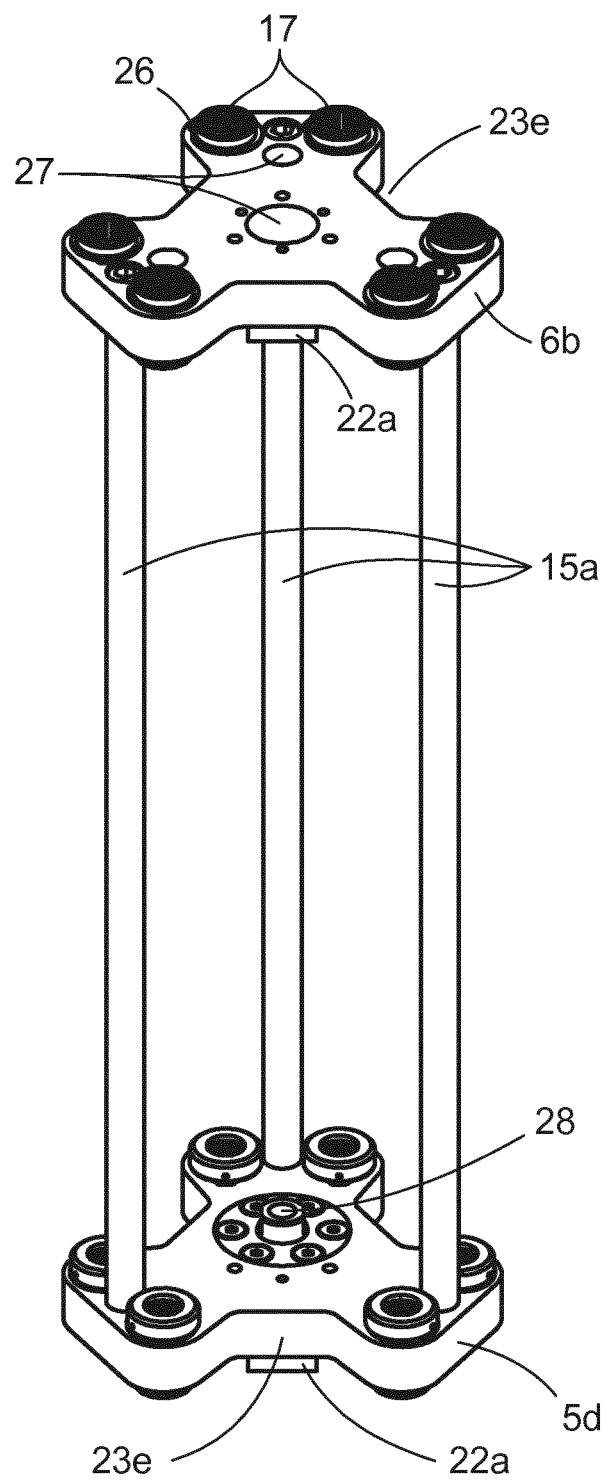

FIG. 28 An axially slidable cage composed of two cage plates with linear bearings and three guide rods, mutually attaching the two cage plates and maintaining their distance to each other. Inside the lower cage plate, a laterally slidable coupling is installed, intended for attachment of an actuator to the axially slidable cage.

Figure 19:
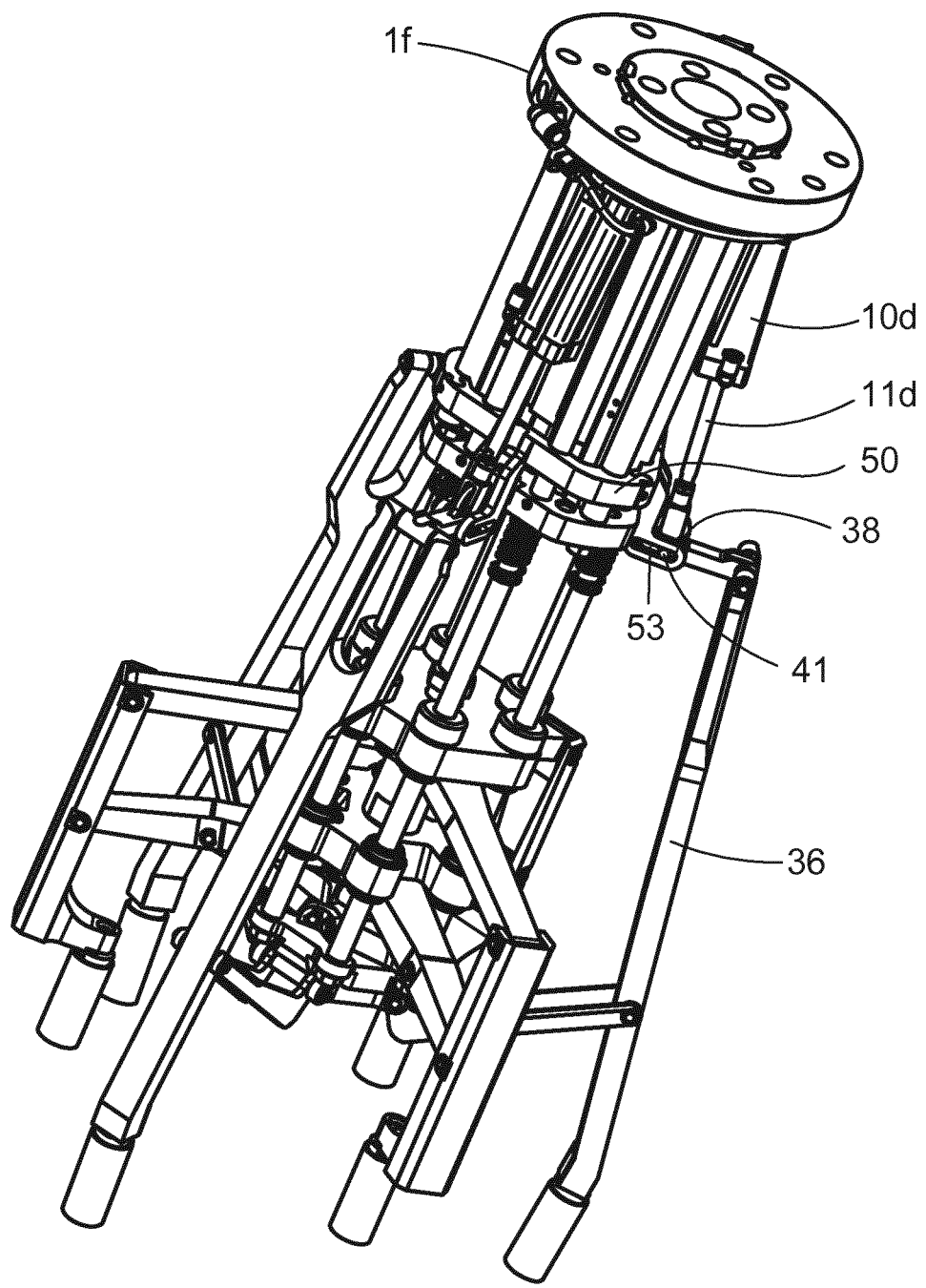
FIG. 19 A version of the long arm gripping mechanism covered by the invention with six finger mechanisms in opened state.
Figure 21:
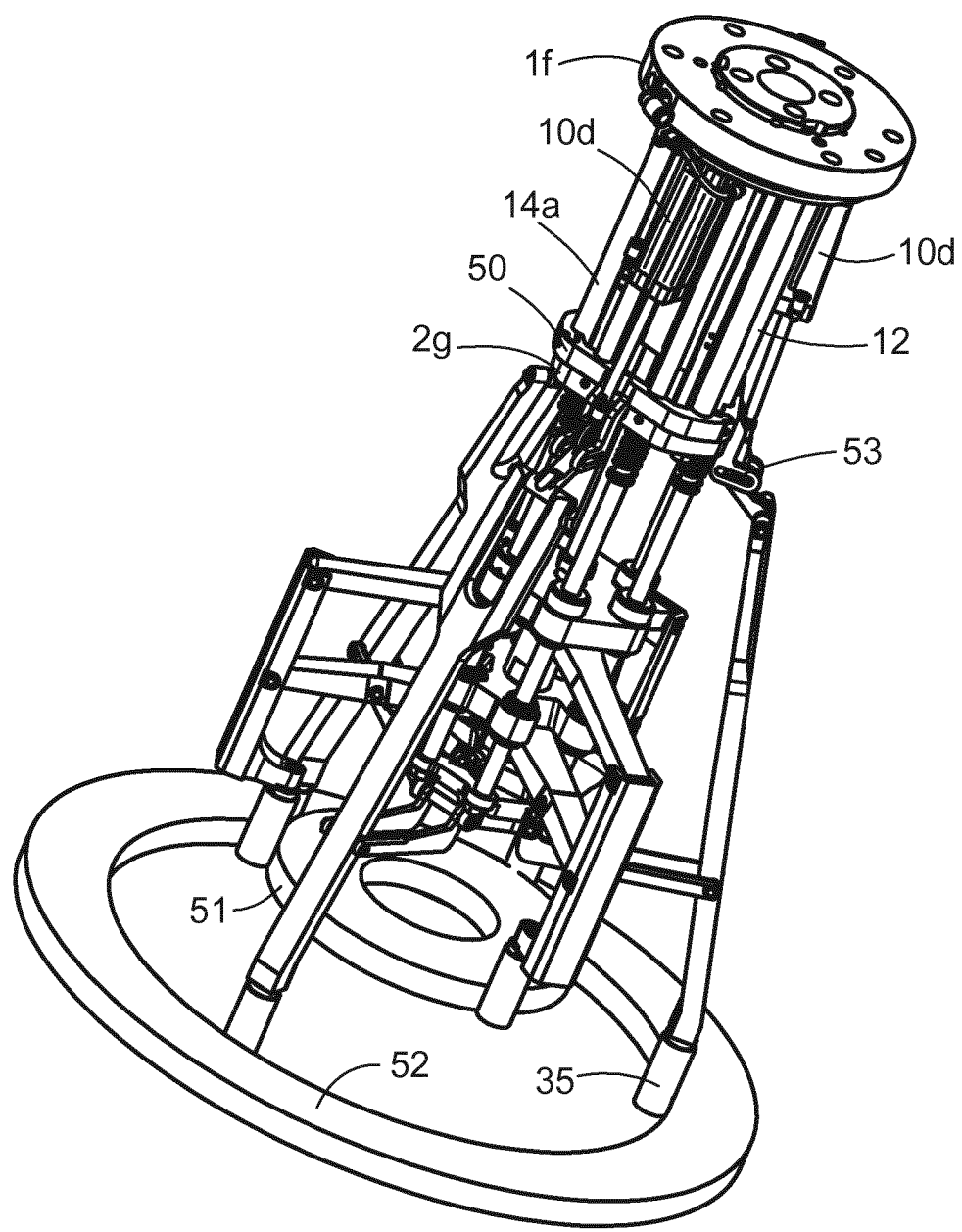
FIG. 21 A version of the long arm gripping mechanism covered by the invention with six finger mechanisms. The first group of three finger mechanisms grasps a round part from outside, whereas the other three finger mechanisms grasp another object from inside, simultaneously or one after the other.
Figure 29:
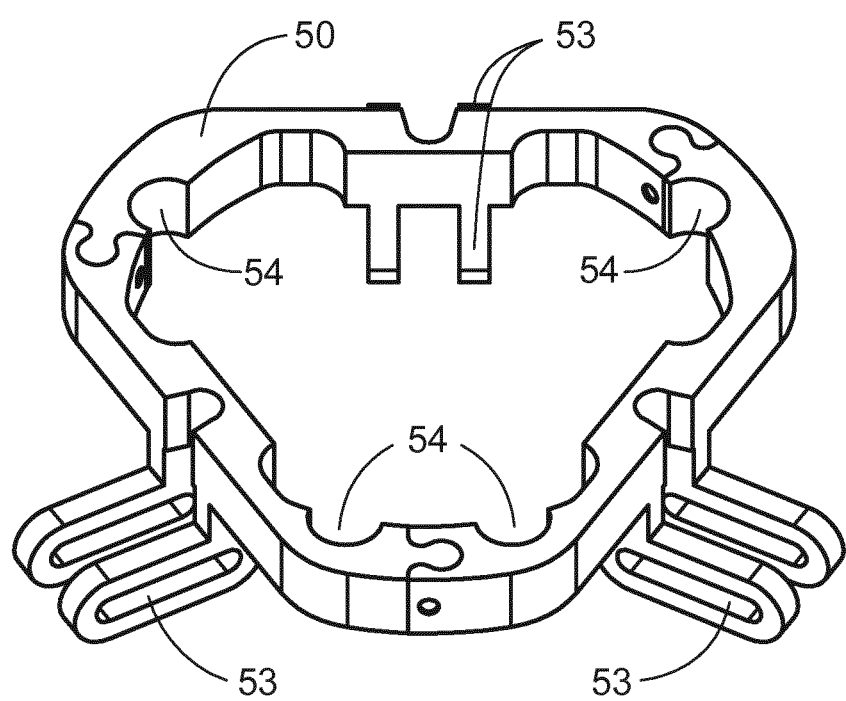

FIG. 29 Perspective view of a synchronization ring for three or more actuators (mounted) around the central axis (A), according to FIGS. 19 and 21.

Figure 30:
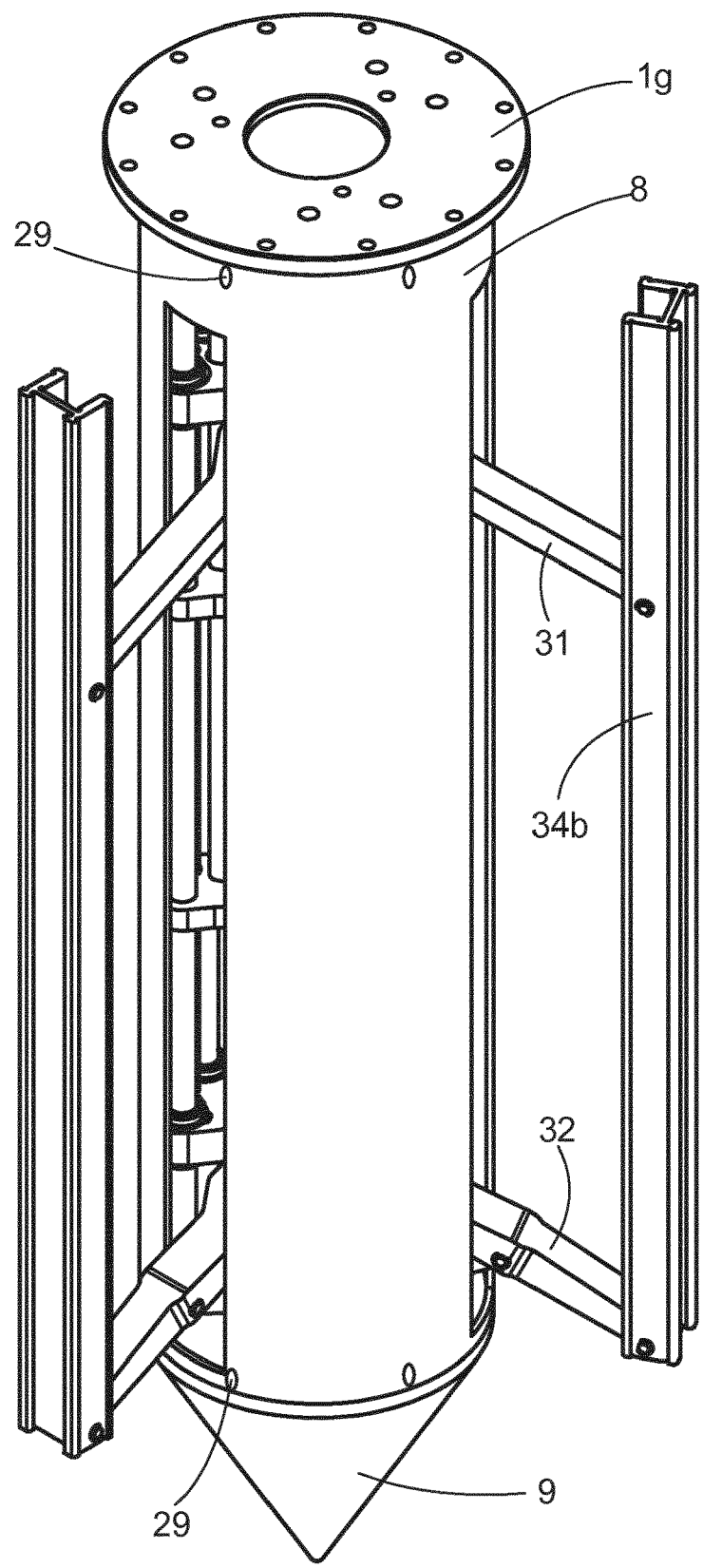

FIG. 30 A long arm gripping mechanism covered by the invention, with a sheathing tube attached to the flange plate, laterally supporting at least one cage plate, preferably the last of them.

The number of identical parts is always the same. Indices with letters designate different versions or sizes of the same element.

DETAILED DESCRIPTION

Figure 1:
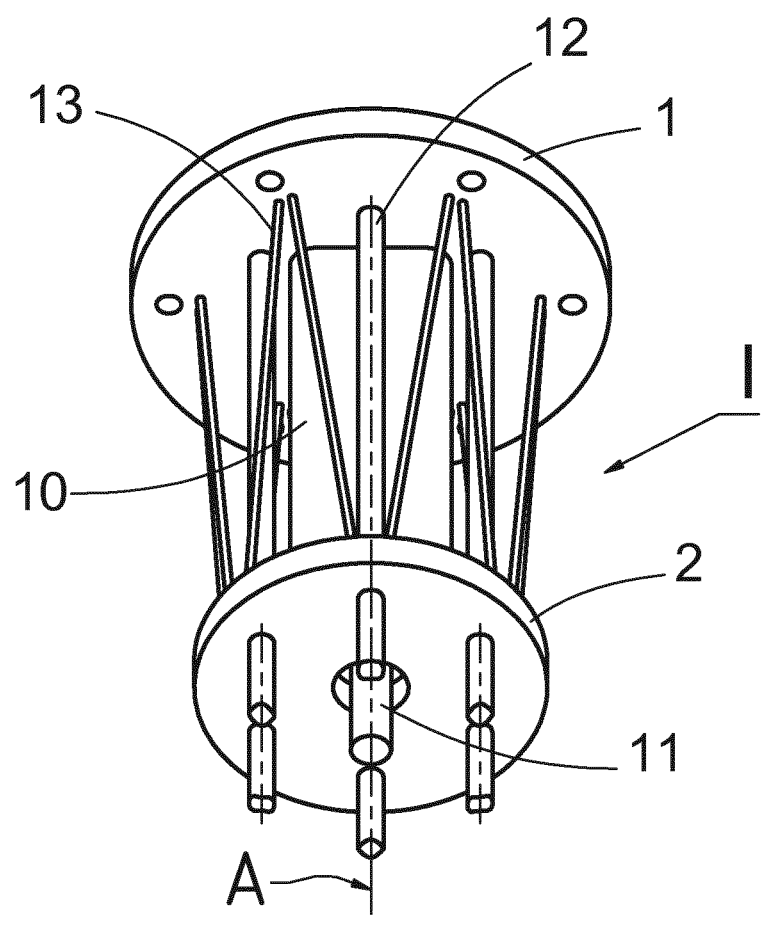
FIG. 1 Schematic view of a flange cage consisting of a round flange plate, a second round cage plate installed in parallel, an actuator clamped between these two plates as drive unit, subjected to pressure originating from the vertical rods installed in parallel on the cage plates and from diagonally running wires, spokes, ropes or strings.

According to FIG. 1, the gripping mechanism respectively the multi-functional gripper mechanism features a flange cage (I), composed of a flange plate (1), a first cage plate (2) and several rods (12) or spokes, wires, ropes or strings (13). The intermediate space between the two plates (1 and 2) houses an actuator (10), a pneumatic cylinder or an electric motor, which driving element, a driving rod, piston rod, rotor shaft or spindle shaft (11) protruding through a bore in the cage plate (2) into the next cage space.

The parallel rods (12) installed vertically on the cage plates are preferably tube-shaped, i.e. hollow. On the one end, they are inserted into the flange plate and firmly connected to it; on the other end they pass through corresponding holes within the cage plate (2) till the next cage plate.

Mutually crossing spokes, wires ropes or strings (13) are clamped between the two cage plates (1 and 2). They run at the left and at the right side in diagonal direction and in parallel to each other, exercising pressure onto the case of the actuator (10). Thanks to this design, the flange cage (I) disposes of a lightweight, but still robust against bending and torsion.

Figure 2:
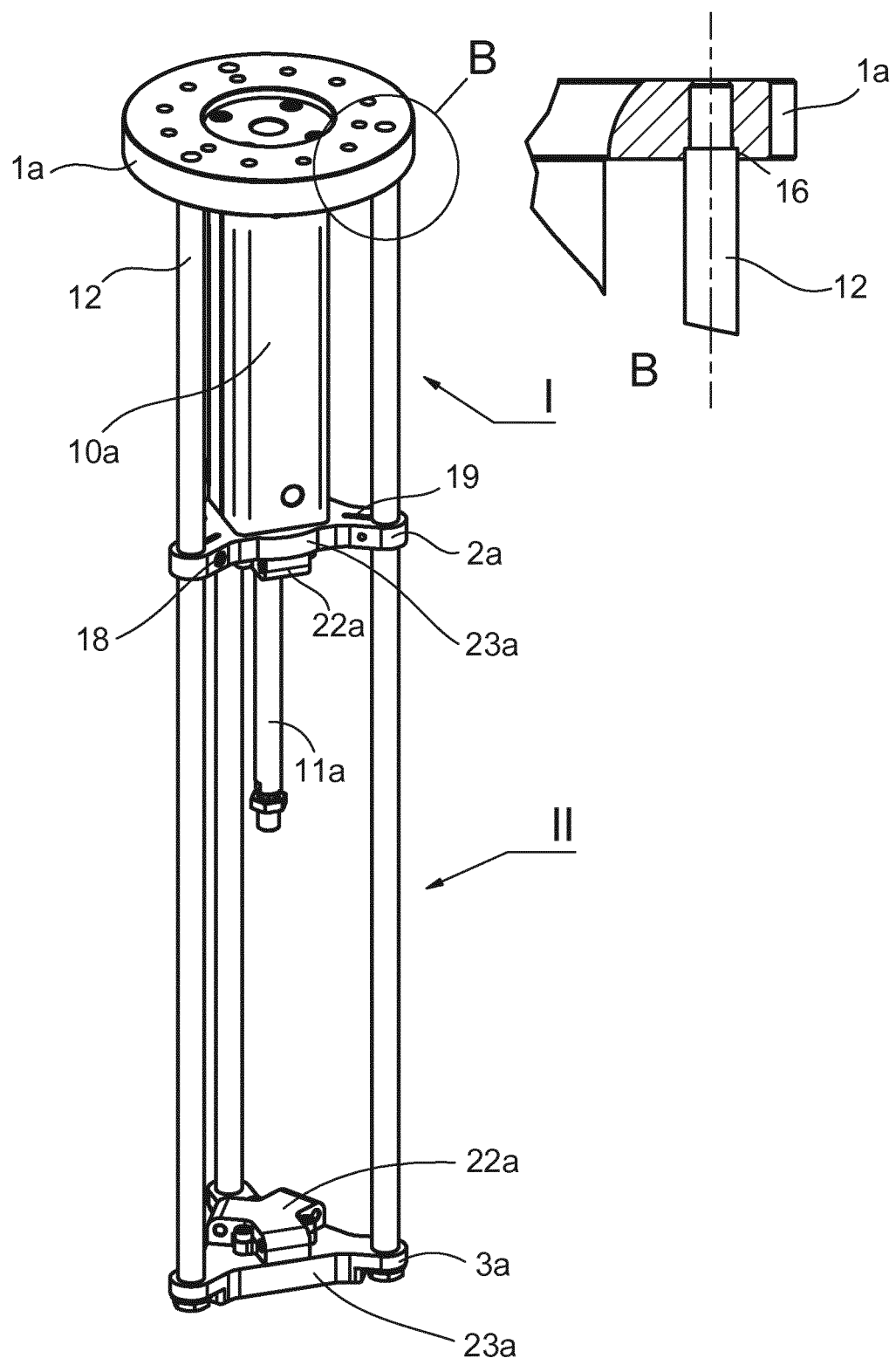
FIG. 2 The frame of the long arm gripping mechanism as a gripper tower consisting of a round flange plate, two triangular-shaped fixed cage plates and three traversing guide rods. The flange cage (I) accommodates an actuator. The driving rod or shaft of this actuator is located in a second cage (II).

According to FIG. 2, the gripper tower of the long arm gripping mechanism is composed of the flange plate (1a), into which three guide rods (12) in partial sections (16) are exactly inserted and firmly bolted in place, as illustrated in cutout (B).

At the rear side of the flange plate (1a), an actuator (10a) is installed. The top of the actuator is connected to a first cage plate (2a) adjustable in height, which features vertical slots or oblong holes (19) enabling the guide rods (12) to pass through. The guide rods are clamped by means of fastening screws (18). At the first cage plate (2a), a fastener for joints (22a) is installed. This item and also other fasteners for joints usually installed to the cage plates are used to attach actuators, links, cranks, gripper fingers or suction arms and other machine elements in a fixed or rotatable manner. The movable part of the actuator, the piston rod, motor shaft or spindle shaft (11a) is freely suspended in space.

To the end of the guide rods, a second cage plate (3a) with a further fastener for joints (22a) is installed and bolted in place. The gripper tower composed this way consists of two or more cages (I and II) installed on top of each other with three or more rods each (12) used as columns. This way, the tower represents (as a frame) the arm and the case of a bending- and torsion-resistant long-arm multifunctional gripping mechanism, which in retracted state integrates within the gripper tower all components including gripper fingers, suction arms, magnetic arms and their actuators. For this purpose, cage plates (2a and 3a) between the guide rods offer cut outs (23a), which are closer to the center axis of the gripper tower than the guide rods themselves.

Figure 3:
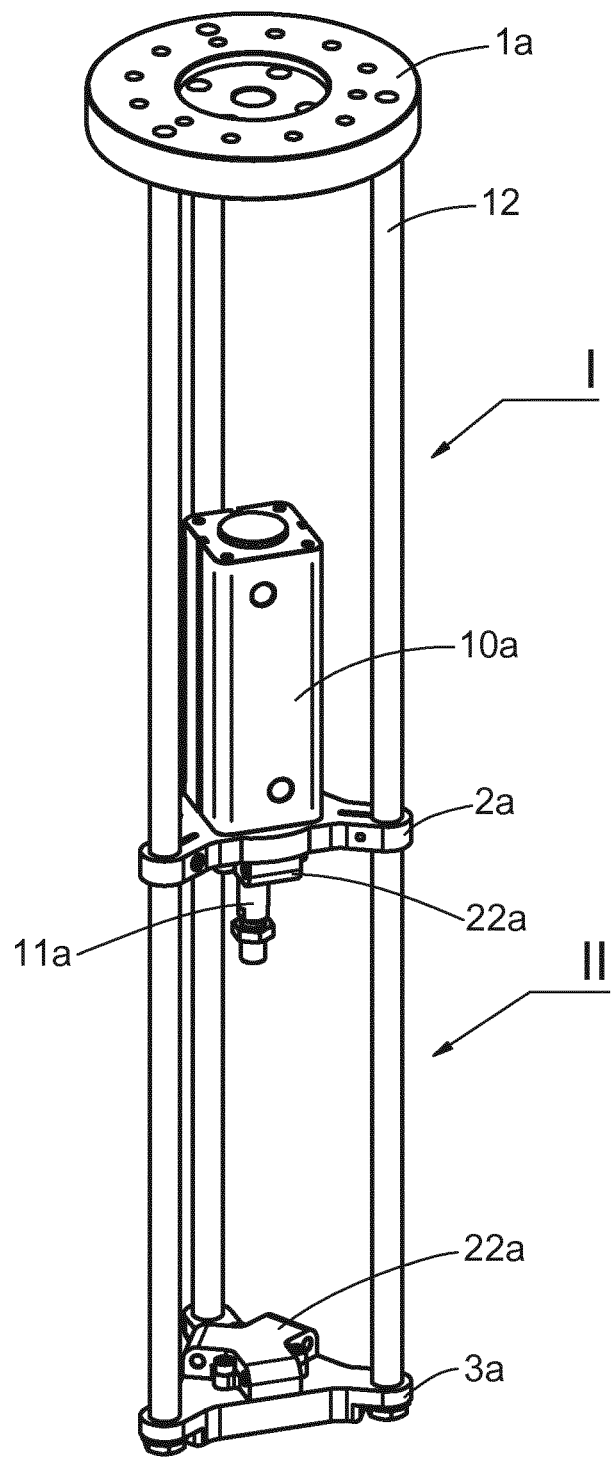
FIG. 3 The frame of the long arm gripping mechanism as a gripper tower consisting of a round flange plate and two triangular-shaped cages. The actuator is attached to the fixed cage plate, which is adjacent to the flange.

According to FIG. 3, the first cage plate with the actuator (10a) is located approximately at the center of the long guide rods (12). This configuration offers maximum space within the first cage (I) for accommodation of other parts of the gripping mechanism. The first cage plate (2a) maintains the mutual distance of the guide rods (12) and protects them from bending or kinking. It is adjustable in height. In the case of higher gripper towers the mutual distance of the rods (12) is ensured by several cage plates adjustable in height.

Figure 4:
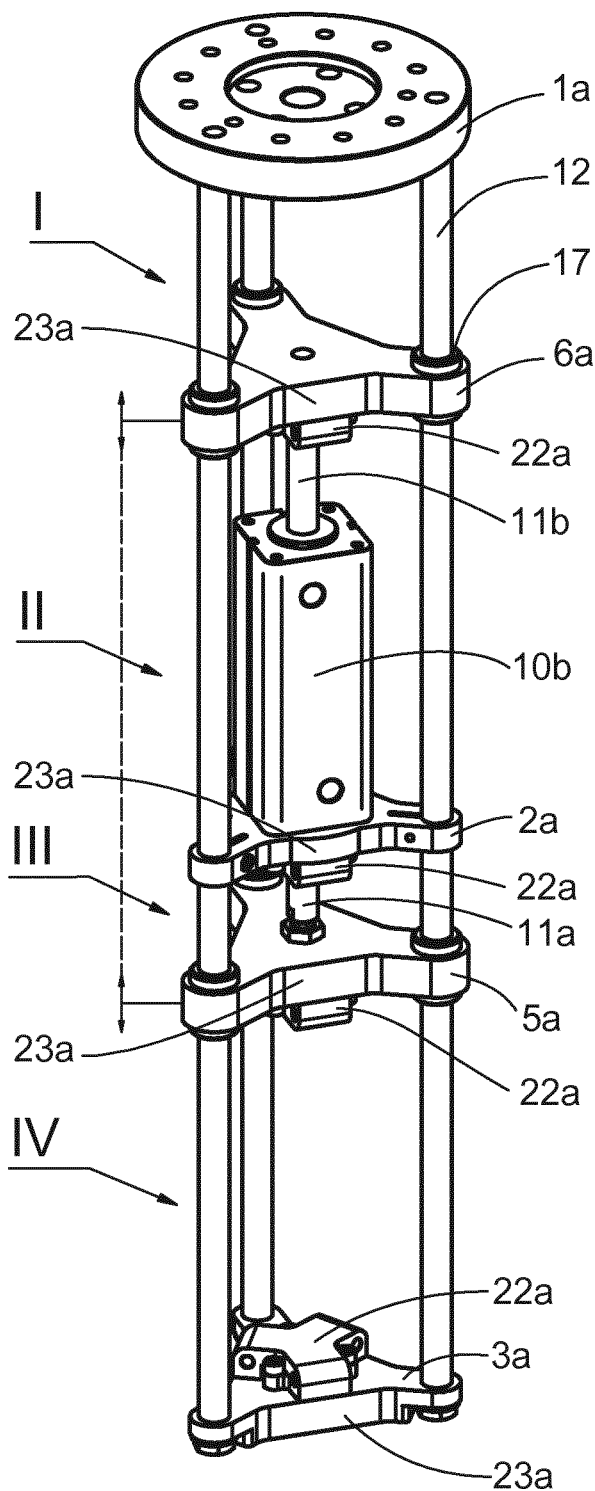
FIG. 4 The frame of the long arm gripping mechanism as a gripper tower consisting of a round flange plate and four triangular-shaped cages. Two of these triangular cage plates are fixed, and two are movable on guide rods. The actuator is firmly installed on the second cage plate, mutually connects and moves the first and the third cage plate by means of its traversing driving rod respectively driving shaft.

According to FIG. 4, above and below the fixed cage plate (2a) one axially slidable cage plate each (5a and 6a) is located, both of them featuring a fastener for joints (22a). These cage plates (5a and 6a) are also equipped with linear bearings (17), enabling them to slide over the guide rods. The actuator (10b) has a driving rod (11a and 11b) passing through, acting on these two axially slidable cage plates (5a and 6a), as this rod is connected to them. The movable cage plates (5a and 6a) stabilize and reinforce the long gripper tower by means of their linear bearings (17) additionally against bending and torsion; furthermore by means of their fasteners for joints (22a), they are used as drive for links, cranks and other machine elements or mechanisms of the long arm gripping mechanism. All cage plates (2a, 3a, 5a and 6a) feature cut outs (23a) for accommodation of movable parts of the gripping mechanism.

Figure 5:
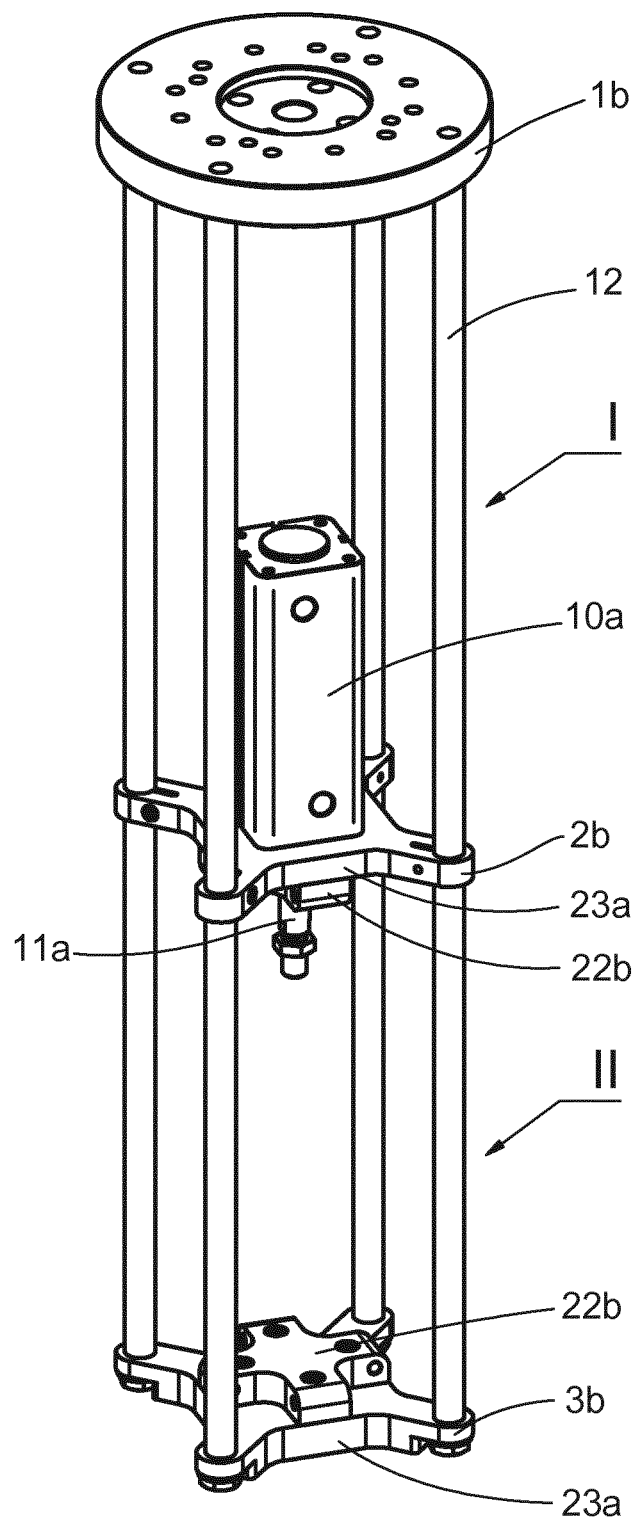
FIG. 5 The frame of the long arm gripping mechanism as a gripper tower consisting of a round flange plate and two square-shaped cages with four guide rods. The actuator is attached to the fixed cage plate, which is adjacent to the flange.

According to FIG. 5, four guide rods (12) are inserted into the flange (1b). For this reason, the cage plates (2b and 3b) and the fasteners for joints (22b) coupled to them dispose of a square-shaped design.

The gripper fingers, suction and magnetic arms as well as other machine elements and mechanisms are installed between the guide rods (12). To perform their task, they pass by these rods.

Figure 6:
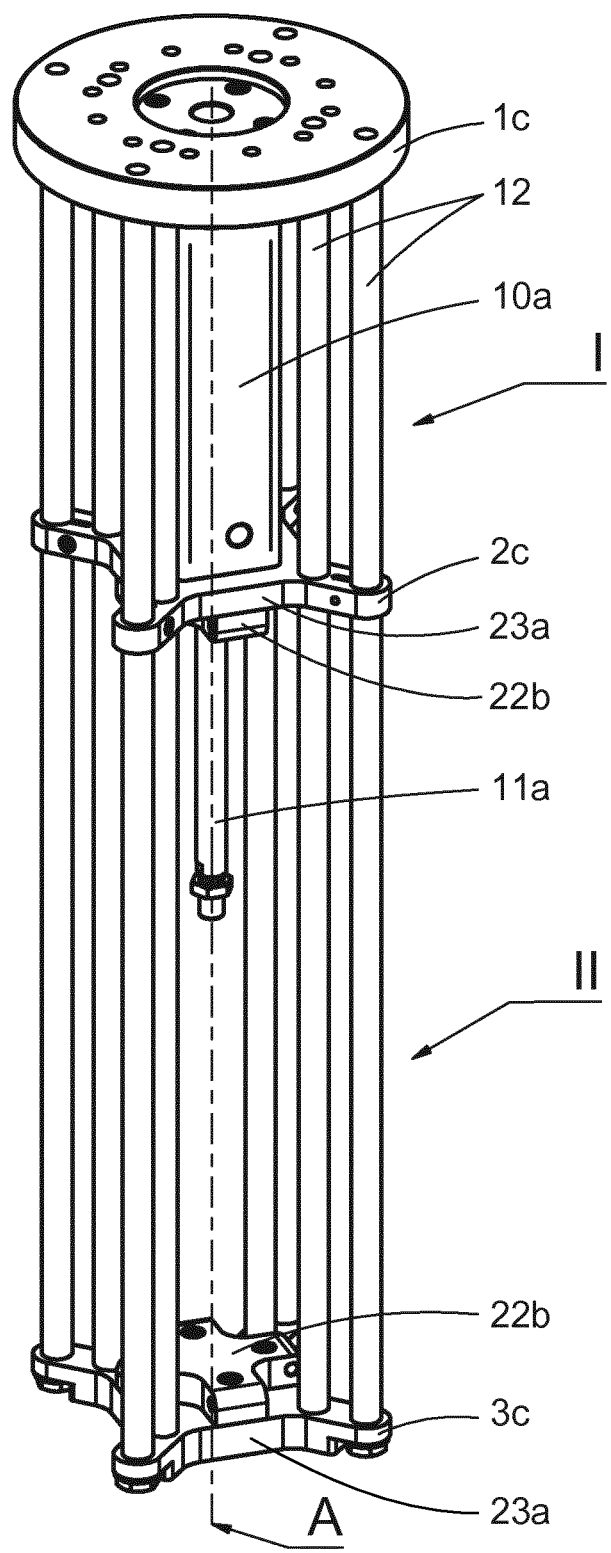
FIG. 6 The frame of the long arm gripping mechanism as a gripper tower consisting of a round flange plate and two square-shaped cages with four double rods. The actuator forms together with the flange and the first cage plate a very stable flange cage.

According to FIG. 6, four double rods (12), twice square-shaped concentrically arranged from the center axis of the gripper tower radially towards outside, form a two-stage gripper tower as frame of the long arm gripping mechanism. The actuator (10a), together with flange plate (1c) and cage plate (2c) represents the flange cage (I). If the task requires it, it is possible to detach the cage plate (2c) from the guide rods (12) with or without the actuator, by means of the screws (18), in order to slide it downwards and to fix it again in place.

Figure 7:
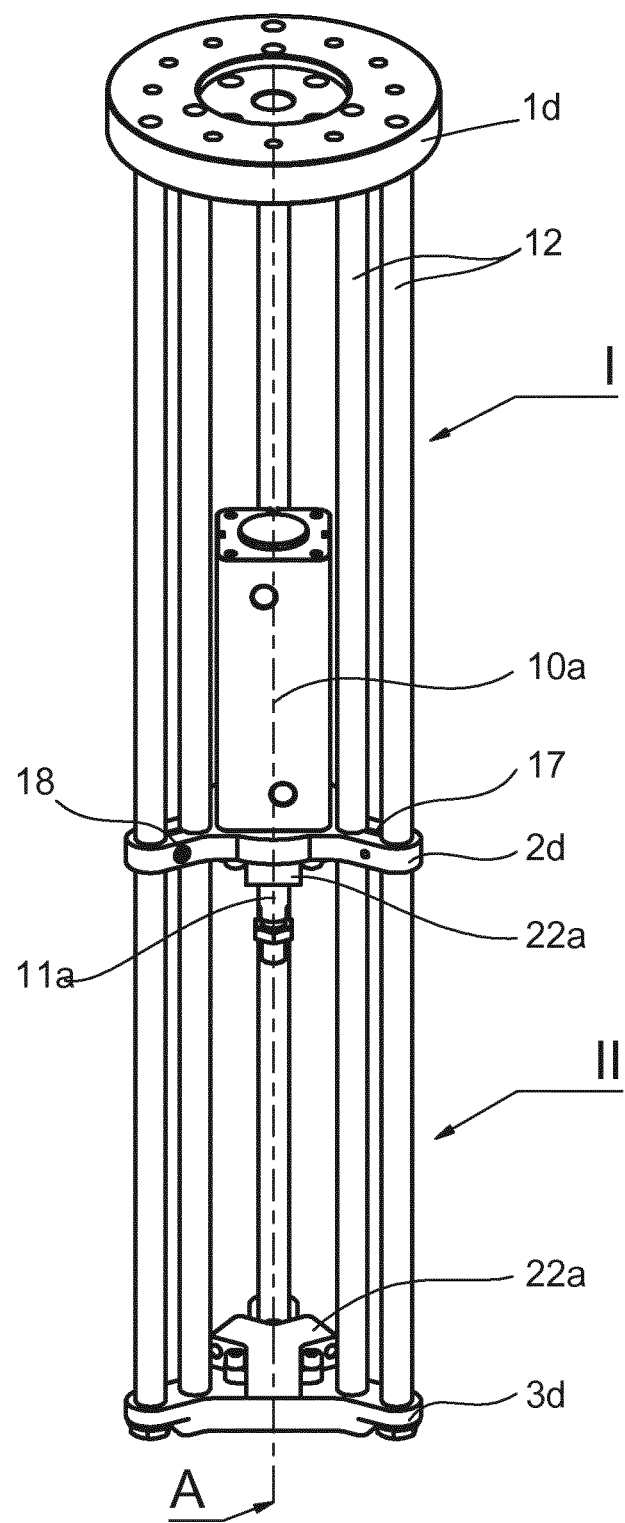
FIG. 7 The frame of the long arm gripping mechanism as a gripper tower consisting of a round flange plate and two triangular-shaped cages with three double rods in radial configuration. The actuator is attached to the fixed cage plate, which is adjacent to the flange.

According to FIG. 7, three double rods (12), twice and triangular-shaped arranged from the center axis (A) of the flange plate (1d) radially towards outside, form the gripper tower as frame of the long arm gripping mechanism.

Figure 8:
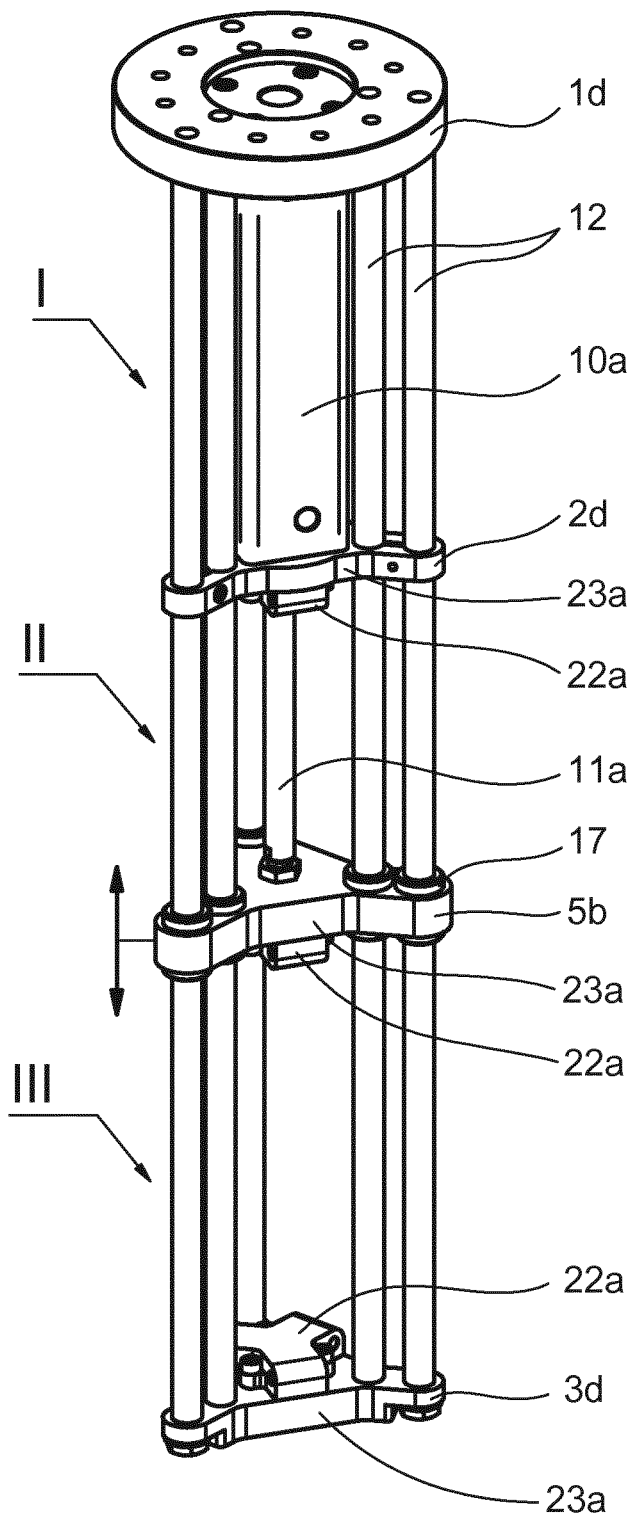
FIG. 8 The frame of the long arm gripping mechanism as a gripper tower consisting of a round flange plate, three triangular-shaped cages with three triangular-shaped double rods in radial configuration. The actuator together with first cage plate forms a flange cage. The driving rod respectively shaft of the actuator acts on the central cage plate, which runs on linear bearings on the guide rods, axially displaceable.

According to FIG. 8, the actuator (10a) is located within the flange cage, clamped between the flange plate (1d) and the cage plate (2d). The driving rod, rotor shaft or spindle shaft (11a) drives up and down the axially movable cage plate (5b) on the guide rods (12). The cage plate (5b) features linear bearings, slide or roller bearings (17) which simplify its sliding motion on the guide rods. By increasing bearing width or height extends the guidance of the guide rods without the need of a thicker and heavier cage plate. The movable cage plate is used as drive of the finger mechanisms, suction and magnetic arms and other movable parts coupled to the gripping mechanism.

Figure 9:
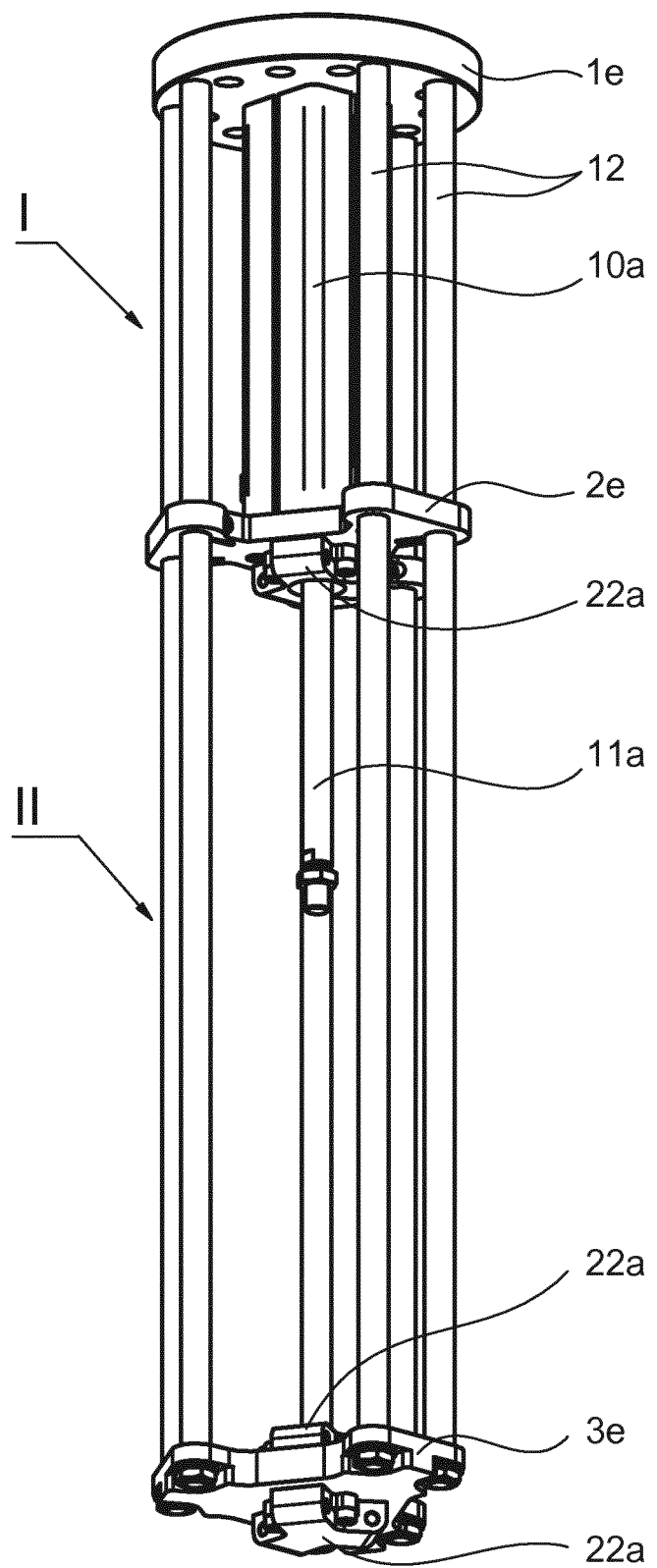
FIG. 9 The frame of the long arm gripping mechanism as a gripper tower consisting of a round flange plate, two fixed cage plates with double corners in a trefoil-shaped configuration and six traversing guide rods. The flange cage accommodates an actuator. The driving rod or driving shaft of this actuator is located in a second cage.

According to FIG. 9, six guide rods (12) in pairs beside each other are distributed over approximately 120° on a circle segment. The flange plate (1e) is round. The other cage plates (2e and 3e) are trefoil-shaped within the flange circle with cut outs for accommodation of other machine parts. Fasteners for joints (22a) complete the cage plates from either or both sides.

Figure 10:
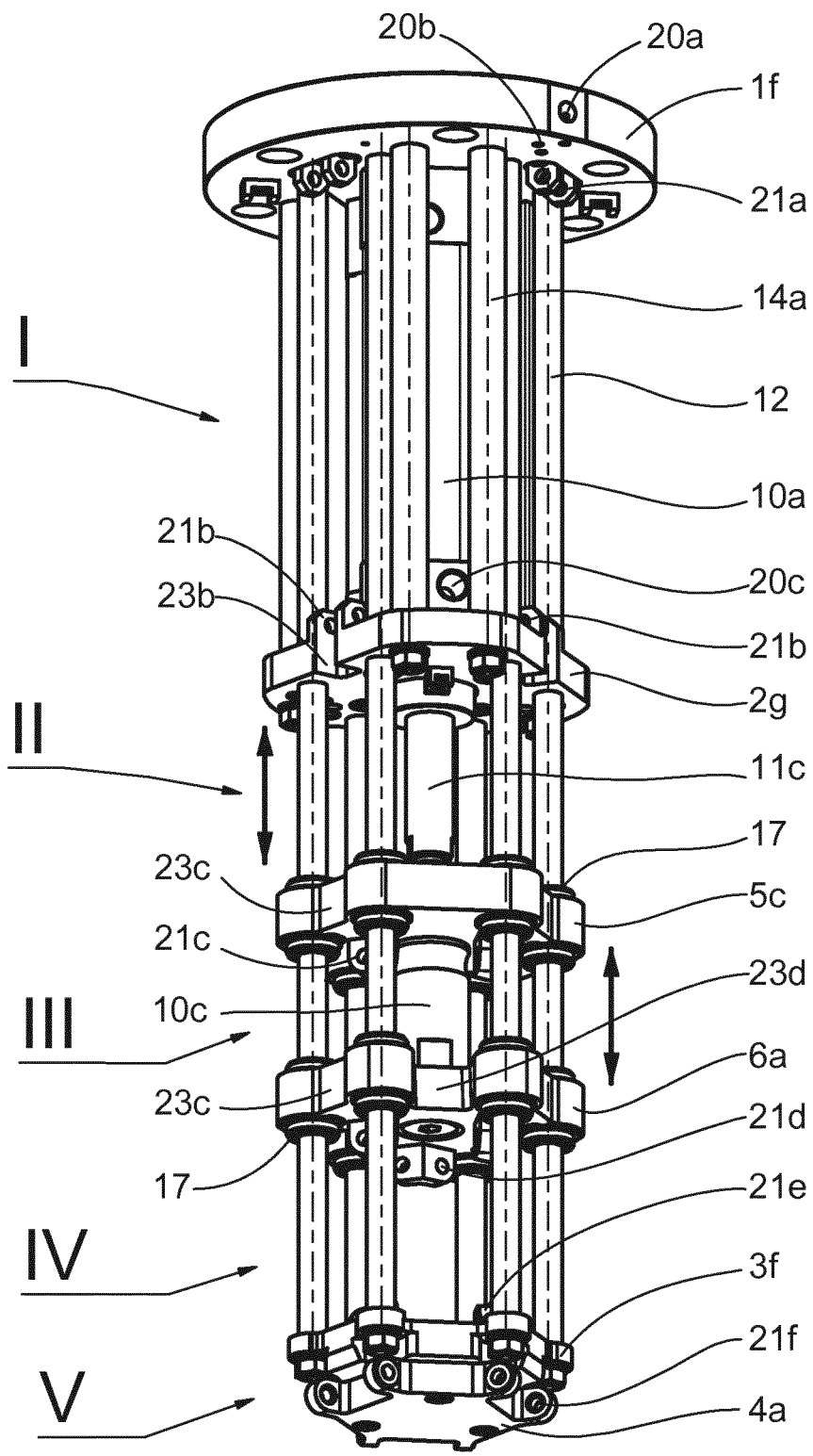
FIG. 10 The frame of the long arm gripping mechanism as a gripper tower with five cages and six guide rods. The design of the cage plates differs with respect to their task. The guide rods are placed in approximately equal distances on an imaginary cylinder. Two axially displaceable cage plates are mutually linked by an actuator, to allow adjustment their distance with respect to each other. The upper of these displaceable cage plates, closer to the gripper flange, is connected to the main actuator housed in the flange case.

According to FIG. 10, the gripper tower consists of five cages (I, II, III, IV and V) placed on top of each other. Starting from flange plate (1f), four guide rods (14a), which can also be hollow, are installed and finally attached to fixed cage plate (2g).

Further massive or hollow guide rods (12) are inserted into the flange plate and attached to it. The guide rods (12) pass through the linear bearings (17) of the movable cage plates (5c and 6a) and are attached to the fixed cage plate (3f). The fixed cage plates (3f) and (4a) feature opposing borings for pins (used as spacers). These fixed cage plates (3f and 4a) are firmly attached to each other and form a closed cage with low distance as well.

All cage plates are intended to feature brackets with holes, used as fasteners for joints (21a to 21f) to enable rotatable connection of links, cranks, couplers and drive elements to be established. Cut outs (23b and 23d) are provided at all cage plates (between rods, spokes, ropes and wires) for accommodation of links, cranks and other movable components of the gripping mechanism. The cage plates are normally star-shaped and made of honeycomb structure which can be produced by 3D printing in an economical process. Material is only intended for positions, where the influence of a load (e.g. to hold a functional part like a bearing in place) or a force vector is expected.

The main drive (10a) is located within the flange cage (I), acting by means of an extension tube (11c) on the first axially movable cage plate (5c). This cage plate (5c) by means of the smaller actuator (10c) is connected to the second movable cage plate (6a). This small actuator (10c) adjusts the mutual distance between the movable cage plates (5c and 6a) whenever required, thus modifying the distance between their pivot points for links, finger, suction and magnetic head mechanisms. This way, the long arm gripping mechanism during handling procedures can assign to its gripper fingers, suction and magnetic arms a second motion possibility, additionally to opening and closing. For instance, they may be swiveled inward or outward during the movement.

Within flange plate and the other cage plates, connecting and through holes (20a, 20b and 20c) as well as interfaces for energy, material and signal lines are provided.

Figure 11:
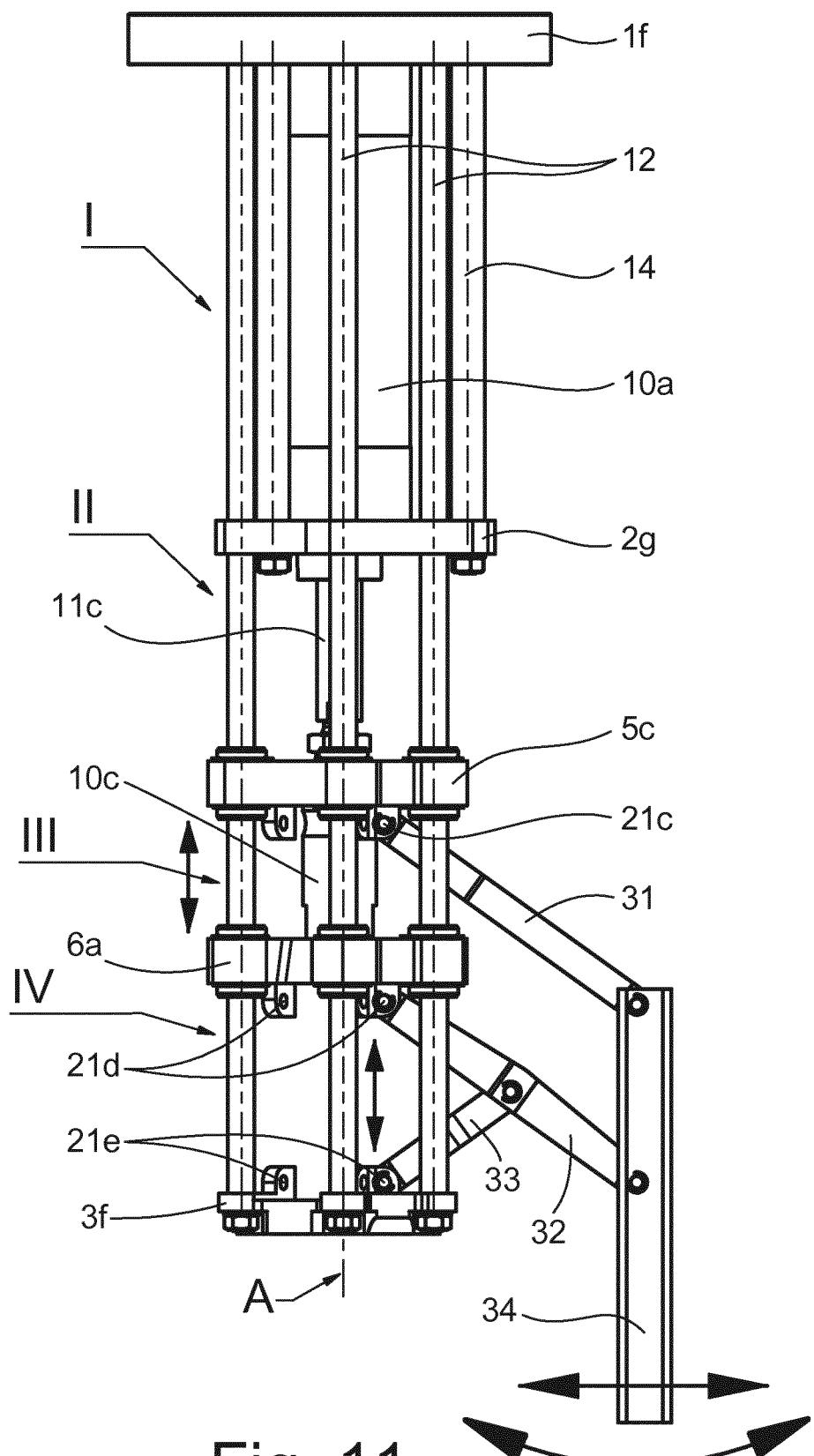
FIG. 11 Lateral view of gripper tower detailed in FIG. 10 with one finger mechanism in half opened state. This finger mechanism consists of a gripper finger, a crank, two links and an axially displaceable cage composed of two movable cage plates as a prismatic joint.

According to FIG. 11 a finger mechanism (31, 32, 33 and 34) is attached in rotatable manner to the fasteners of the joints (21c, 21d and 21e) of cage plates (5c, 6a and 3f).

Actuator (10a) by means of extension element (11c) is attached to movable cage (III), pushing it up and down on guide rods (12).

Cage (III) acts as slider and driving element for six-link-bar finger mechanism (12, III, 31, 32, 33 and 34). Both cage plates (5c and 6a) of cage (III) are mutually coupled by actuator (10c). Synchronous motion of cage plates (5c and 6a) opens and closes the gripper finger (34) in parallel or swiveling. If the distance between joints (21c and 21d) is modified by means of actuator (10c), the gripper finger with respect to gripper axis (A) is inclined in either direction.

Figure 12:
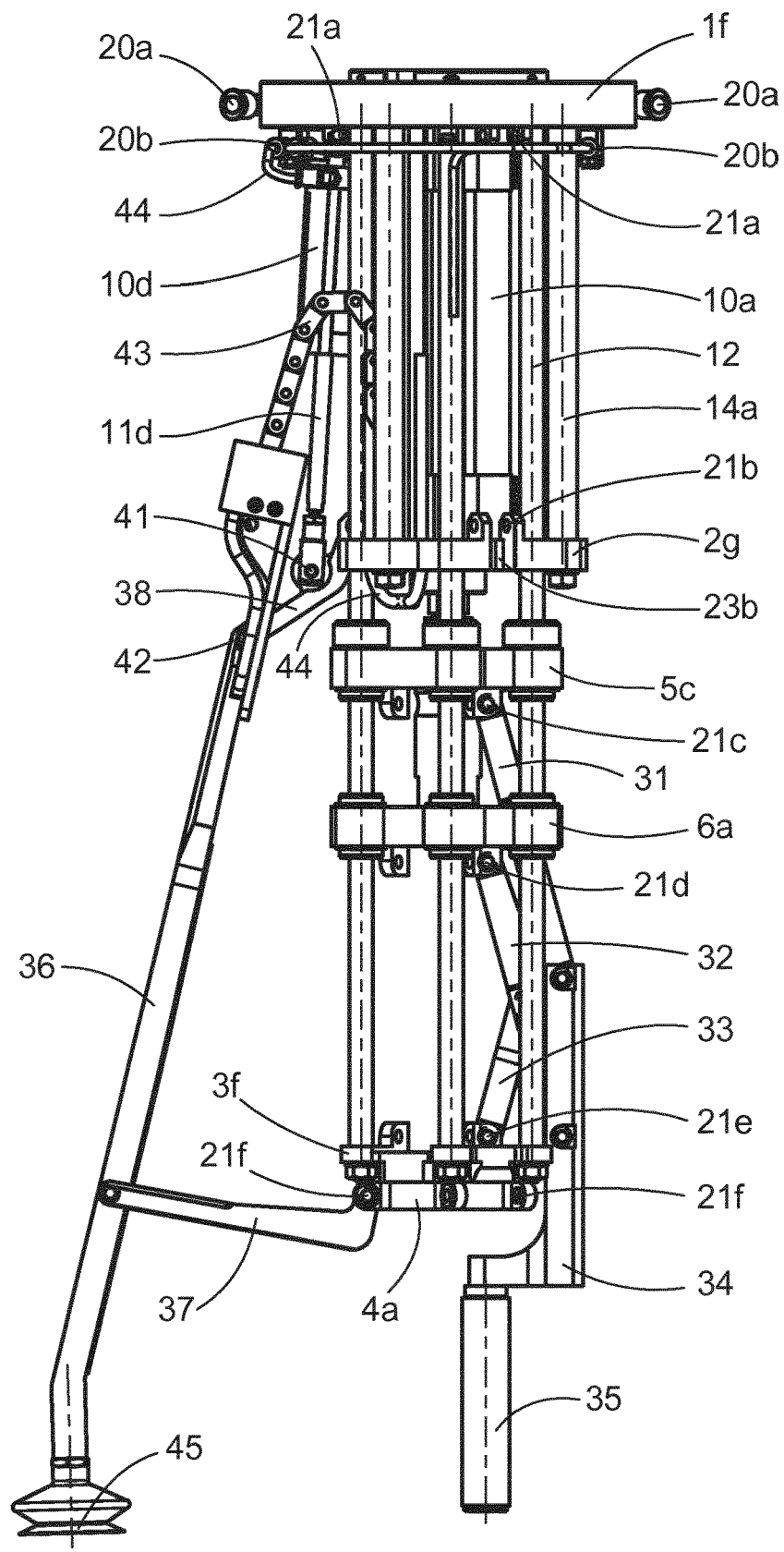
FIG. 12 Lateral view of a version of the long arm gripping mechanism with one finger mechanism in closed state and a suction mechanism, called suction arm, in extended state.

According to FIG. 12, the gripper tower features a finger mechanism (31, 32, 33 and 34) with an inwardly crimped round gripper top jaw (35). This finger mechanism is operated by actuator (10a) housed within the flange cage. Opposing to this finger, a further mechanism is installed to the gripper tower: A crank-rocker mechanism (12, 36, 37 and 38) with suction cup (45) at its coupler (36). The small actuator (10d) is attached to the joint (21a) of the flange plate (1f), acting by means of its driving rod or shaft (11d) on the joint (41) of the crank (38), thus moving in and out the suction mechanism from the gripper tower.

The mutual distance of the joints (21b, 21c, 21d and 21e) at the gripper tower within the cages is so narrow, that the gripper fingers (34 and 36) during retraction between the guide rods move into a cylinder around the guide rods. Meanwhile cranks and links are partially mutually inserted and inserted into the gripper fingers as well.

Starting from the suction cup (45), a vacuum hose (44) is placed through the suction arm (36) upwards, traversing the power chain (43) downward through cage plate (2g), and then upward again to connector (20b) located at the bottom of flange plate (1f). By means of holes within the flange plate, connector (20b) is connected to external connector (20a) located at the perimeter of the flange plate.

Figure 13:
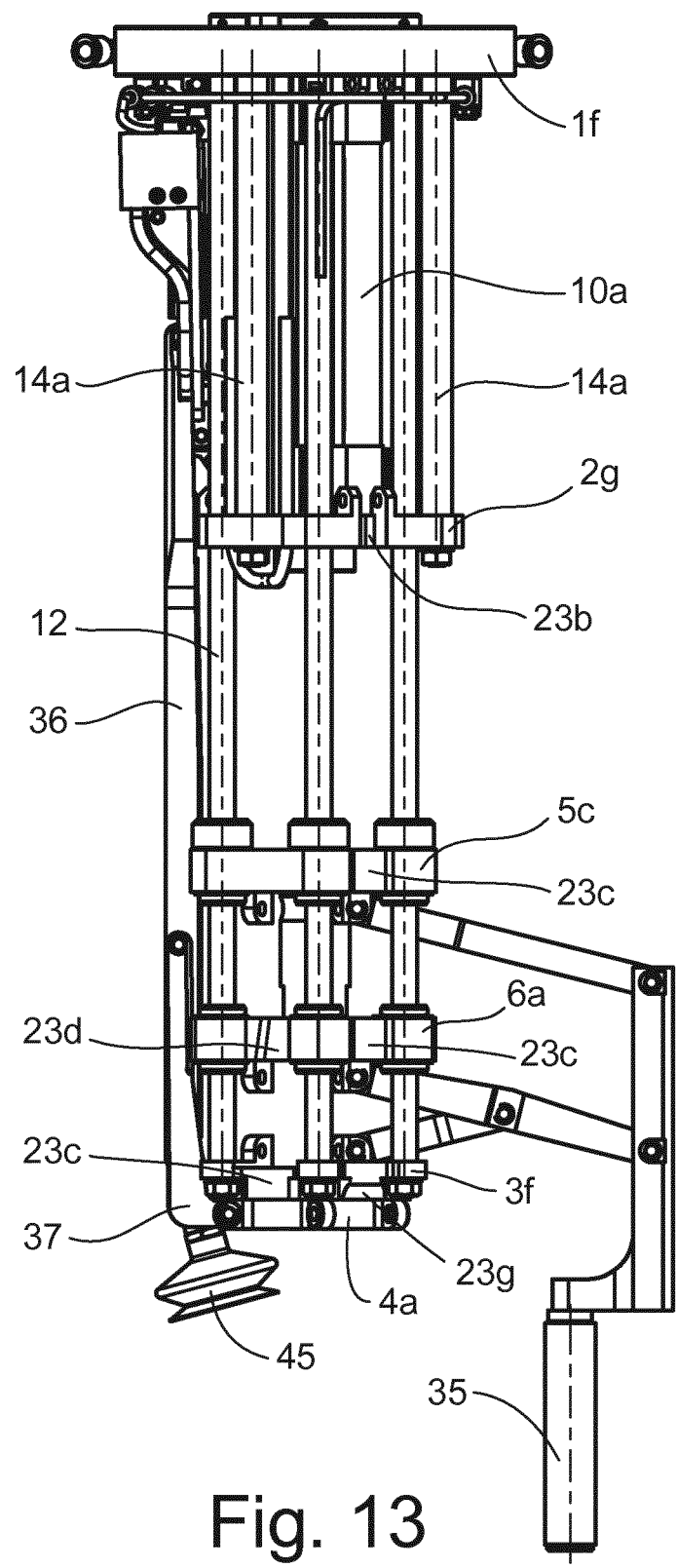
FIG. 13 Lateral view of a version of the long arm gripping mechanism according to FIG. 12, with one finger mechanism in opened state and a suction mechanism in retracted state.

In FIG. 13, the right finger mechanism has opened its round gripper top jaw (35) in parallel, and exactly linear, whereas the left mechanism with suction cup (45) has moved into a coincide and one line inserted position, vertically and as close as possible between guide rods (12 and 14a) into the cut outs (23b, 23c, 23d and 23g) of the cage plates.

Figure 14:
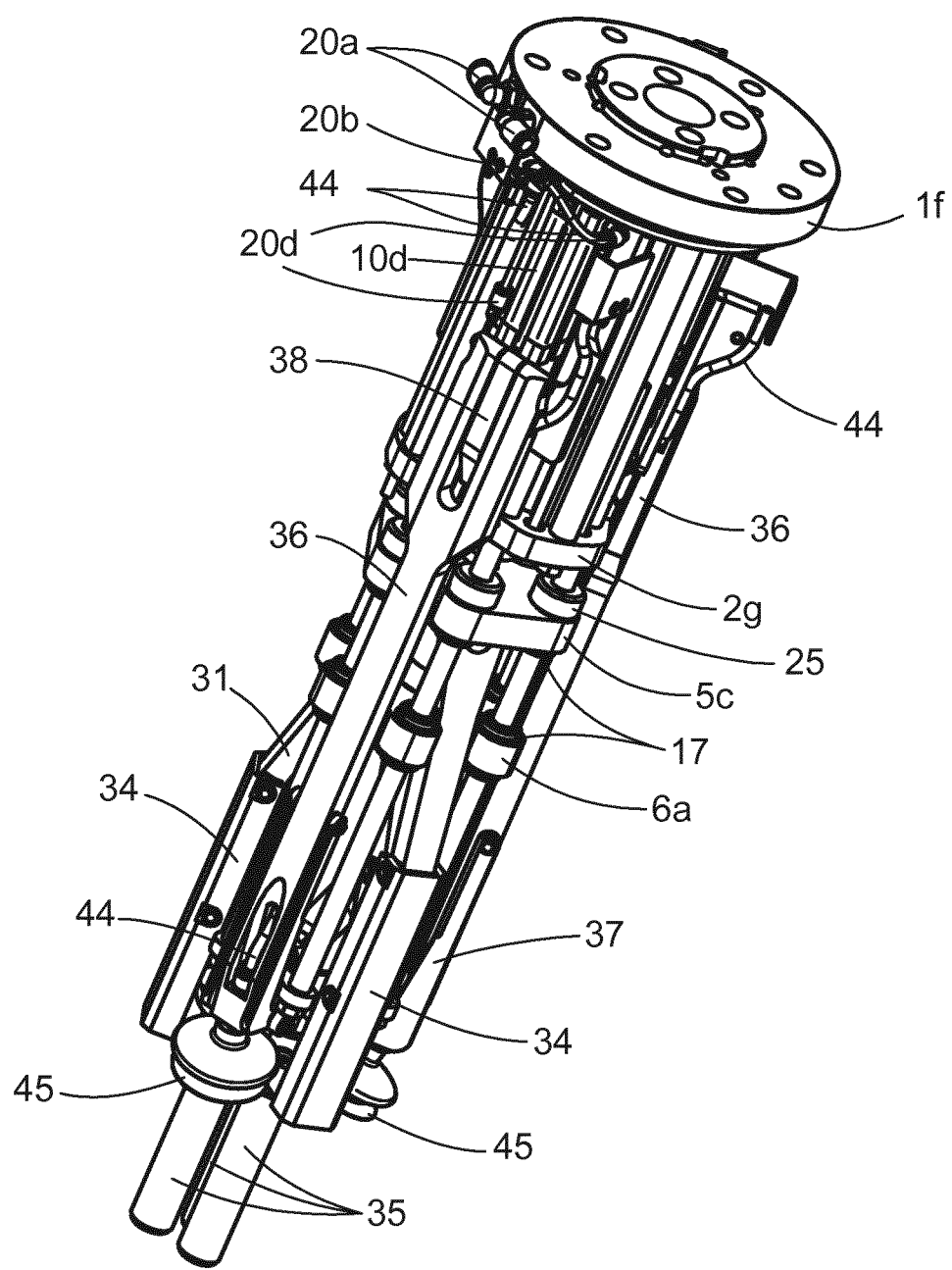
FIG. 14 Perspective view of the long arm gripping mechanism with three finger mechanisms to grasp parts, and three suction arms for aspiration of flat elements like paper, cardboard or similar objects. In retracted state, this multifunctional long arm gripping mechanism featuring altogether six gripping and suction mechanisms and four actuators, represents a very compact and very slim cylindrical body.

According to FIG. 14, the long arm gripping mechanism itself with altogether six finger and suction mechanisms in completely retracted state forms a slim cylindrical entity, bending- and torsion-resistant.

By movable cage (III) (FIG. 11), the round gripper top jaws (35) are synchronously operated by means of actuator (10a) (FIGS. 11, 12 and 13) placed centrally within the flange cage. The mechanisms of the suction cups feature their own actuators (10d), in case of need synchronized by an additional ring (50) (FIG. 17). Link (32) and crank (33) during retraction penetrate into the gripper finger (34). As to the suction mechanism, the crank (38) (FIGS. 12, 14, 15 and 16) in retracted state is arranged in a straight line with the coupler (36) and the rocker (37) in parallel to the longitudinal axis (A) (FIG. 11) of the gripper. Partially they penetrate into each other, very close to the one line coincide and extended position. The protecting cap (25), intended to prevent damage to the linear bearing due to contamination and mechanical impact, is equipped with a wiper in a hollow cylindrical body.

Figure 15:
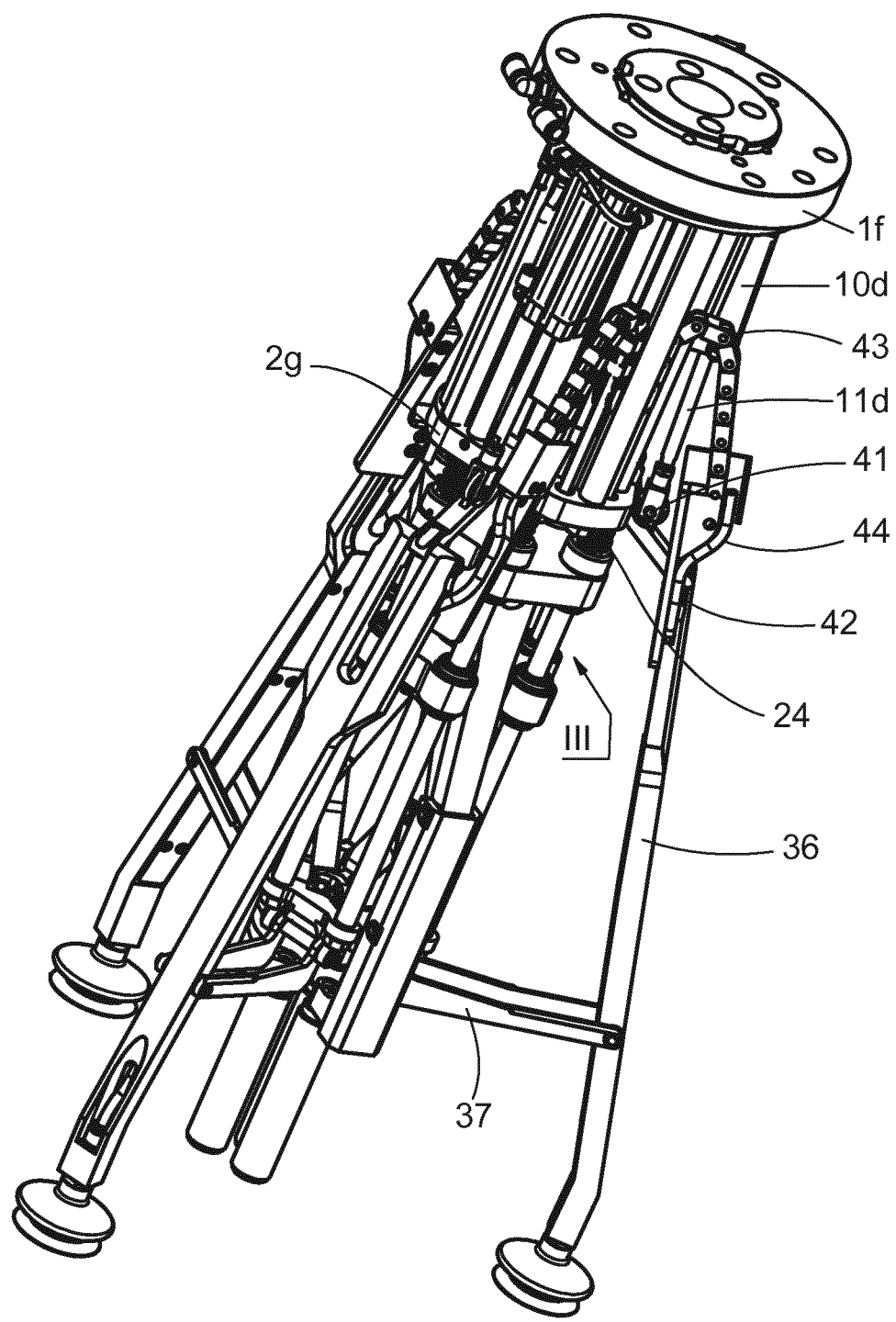
FIG. 15 Perspective view of a version of the long arm gripping mechanism covered by the invention, with three closed finger mechanisms and three extended suction arms.

According to FIG. 15, the gripper tower allows installation of several varying mechanisms for different tasks. In this case three finger mechanisms are in retracted, three suction mechanisms in completely extended state. The mechanisms may be operated individually, in groups or in common. Above the movable cage (III), compression springs (24) are installed on the guide rods (12), supporting the mechanisms when moving out from retracted position in one line coincide and extended position, to find their way towards outside. Supply lines of energy or vacuum (44) start from the flange plate (1f), then run within the flange cage downward, traverse the cage plate (2g), and after a turnaround of 180°, run through the power chain (43) and holes within the coupler (36) to the suction cup or magnetic head.

Figure 16:
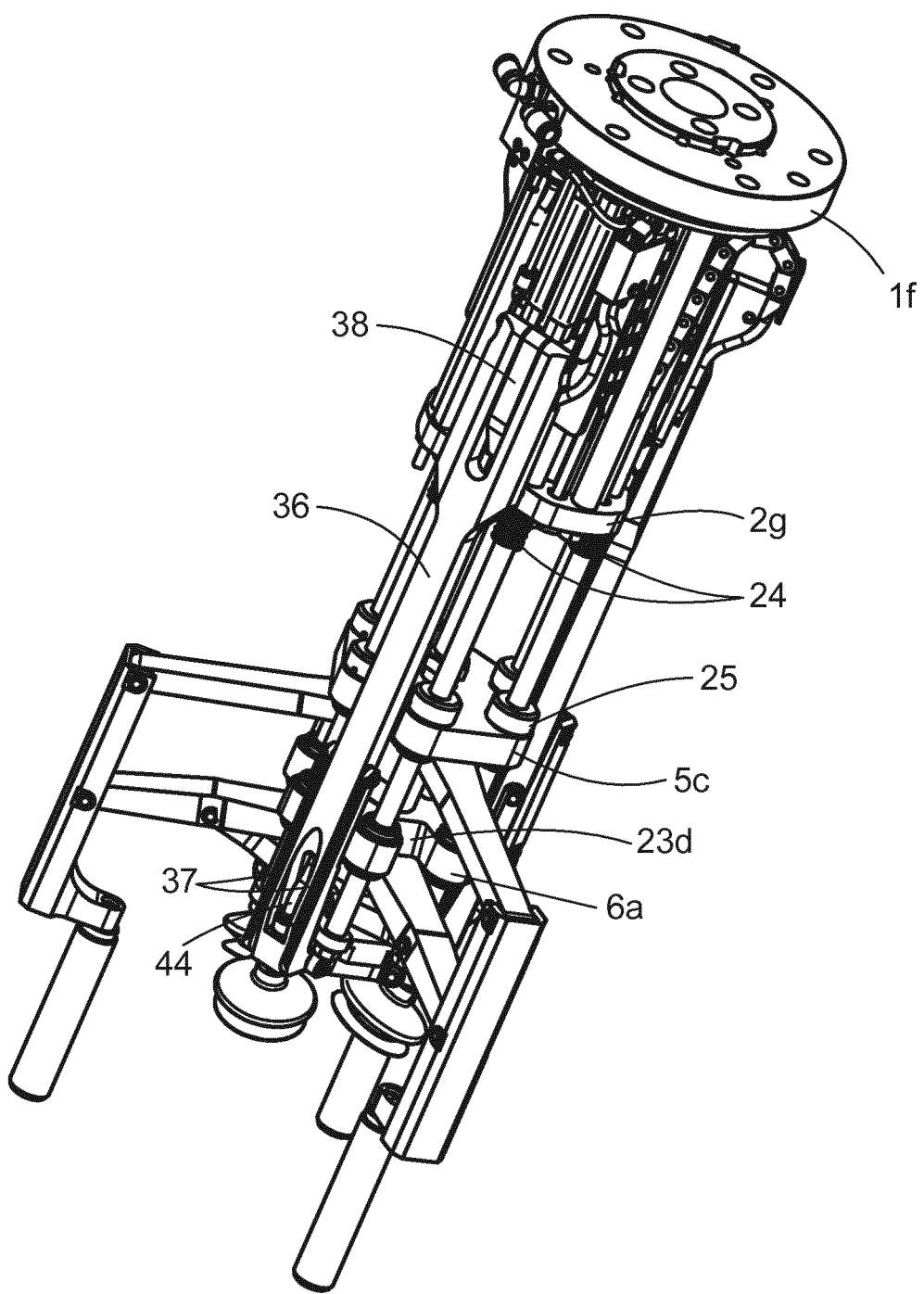
FIG. 16 Perspective view of a long arm gripping mechanism covered by the invention, with three opened finger mechanisms and three retracted suction arms.
Figure 17:
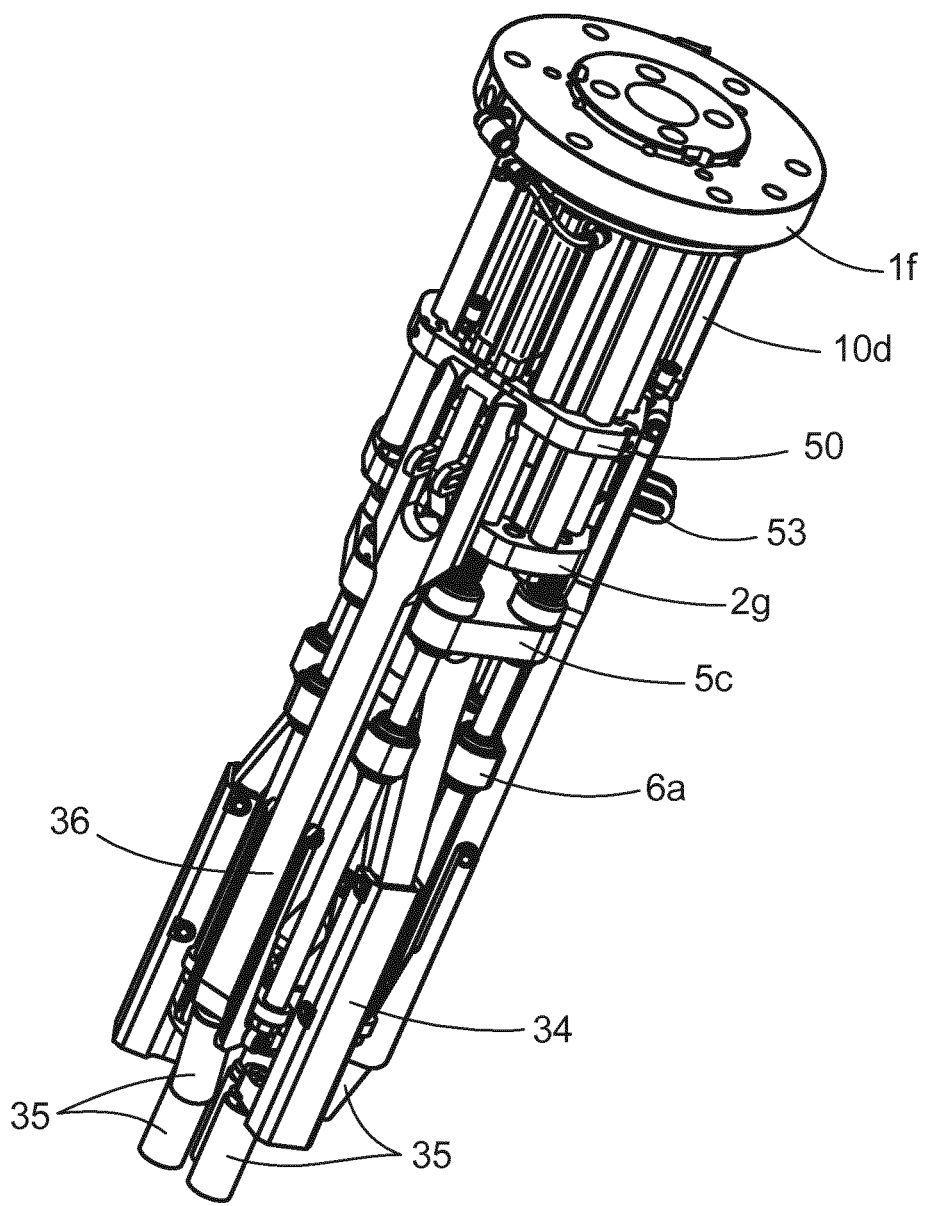
FIG. 17 Perspective view of another version of the long arm gripping mechanism covered by the invention, with six gripper fingers composed of two groups of three finger mechanisms each, intended for different tasks correspondingly. Three closed finger mechanisms move their gripper fingers in parallel and in an exactly linear motion, whereas the other three closed finger mechanisms move their gripper fingers individually or synchronized on a coupler curve.

In FIG. 16, three suction mechanisms are retracted, and the three finger mechanisms with a linear finger motion are nearly completely opened. The caps (25) protect the bearings (17), also with respect to damage issuing from springs (24).

According to FIG. 17, two groups of three different finger mechanisms each are provided at the gripper tower. All these six gripper fingers dispose of round cylindrical gripper top jaws (35). They all are in closed state, forming a compact and long cylindrical entity.

Figure 18:
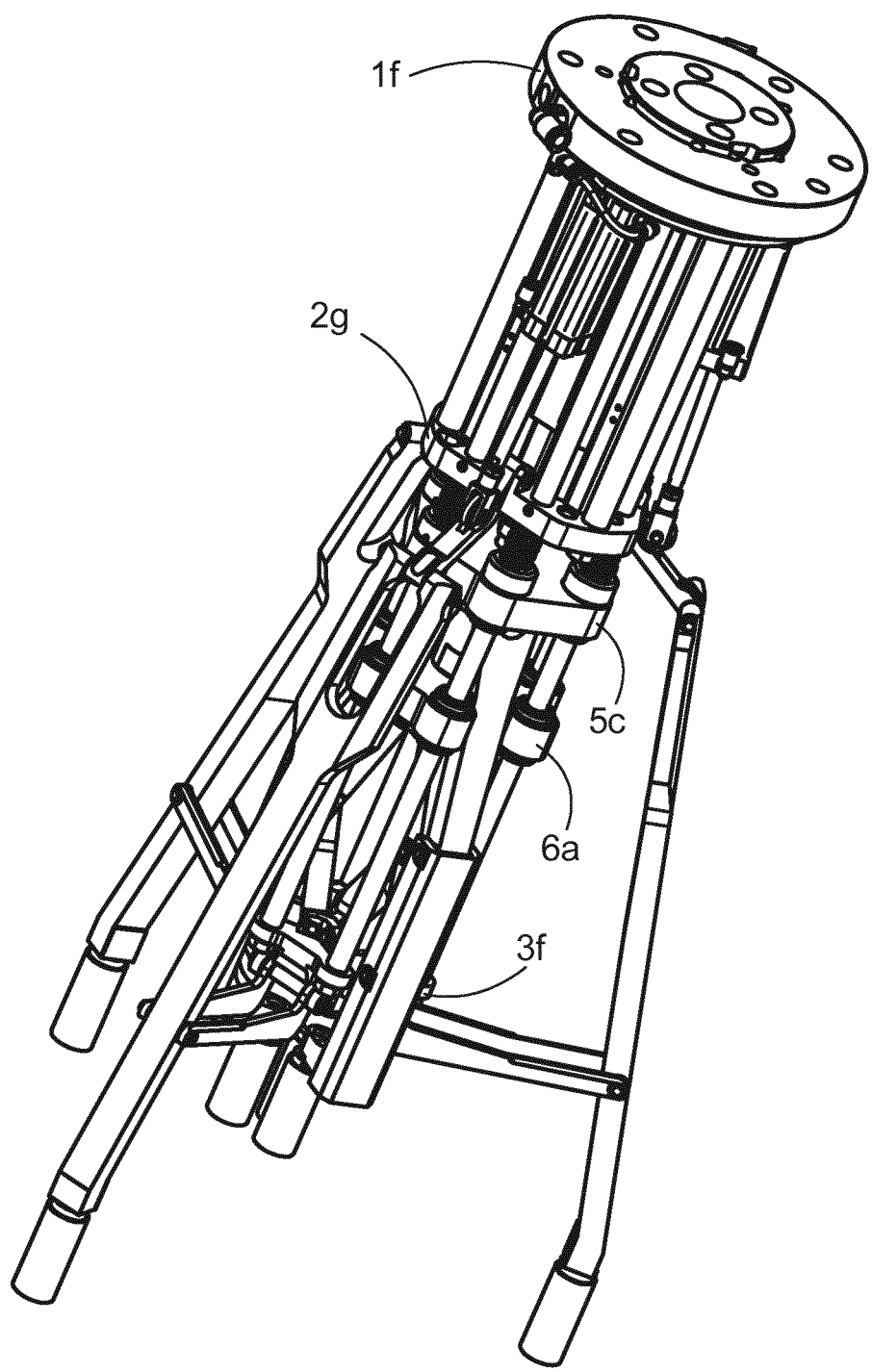
FIG. 18 Version of the long arm gripping mechanism covered by the invention according to FIG. 17. The group linearly guided in parallel is in retracted state, whereas the second group of finger mechanisms is opened.

In FIG. 18, the group of three mechanisms with parallel and straight finger motion is closed, whereas the second group of three mechanisms with a nearly circular motion of their gripper top jaws is open. According to application and task, the geometrical configuration of the mechanisms enables the gripper top jaws to be positioned in groups, whether in one single or in several levels, so that different workpieces may be grasped or placed one by one or simultaneously.

According to FIG. 19, the long arm gripping mechanism features two groups of three finger mechanisms each, both of them in extended i.e. opened state. The actuation of three mechanisms with parallel and straight finger motion takes place simultaneously by means of an actuator and axial movement of a cage. The other three mechanisms feature their own actuator (10d) each. Their fingers may be moved individually, or (as shown here) synchronized by synchronization ring (50). At the perimeter of the synchronization ring (50), radial long holes (53) are provided, in which the hinge pin (41) of the swivel joint between driving rod (11d) and the crank (38) is guided as a slider (prismatic joint). The synchronization ring slides over the guide rods (12 and 14a) like an axially movable cage plate. It can be provided also in form of a movable cage.

Figure 20:
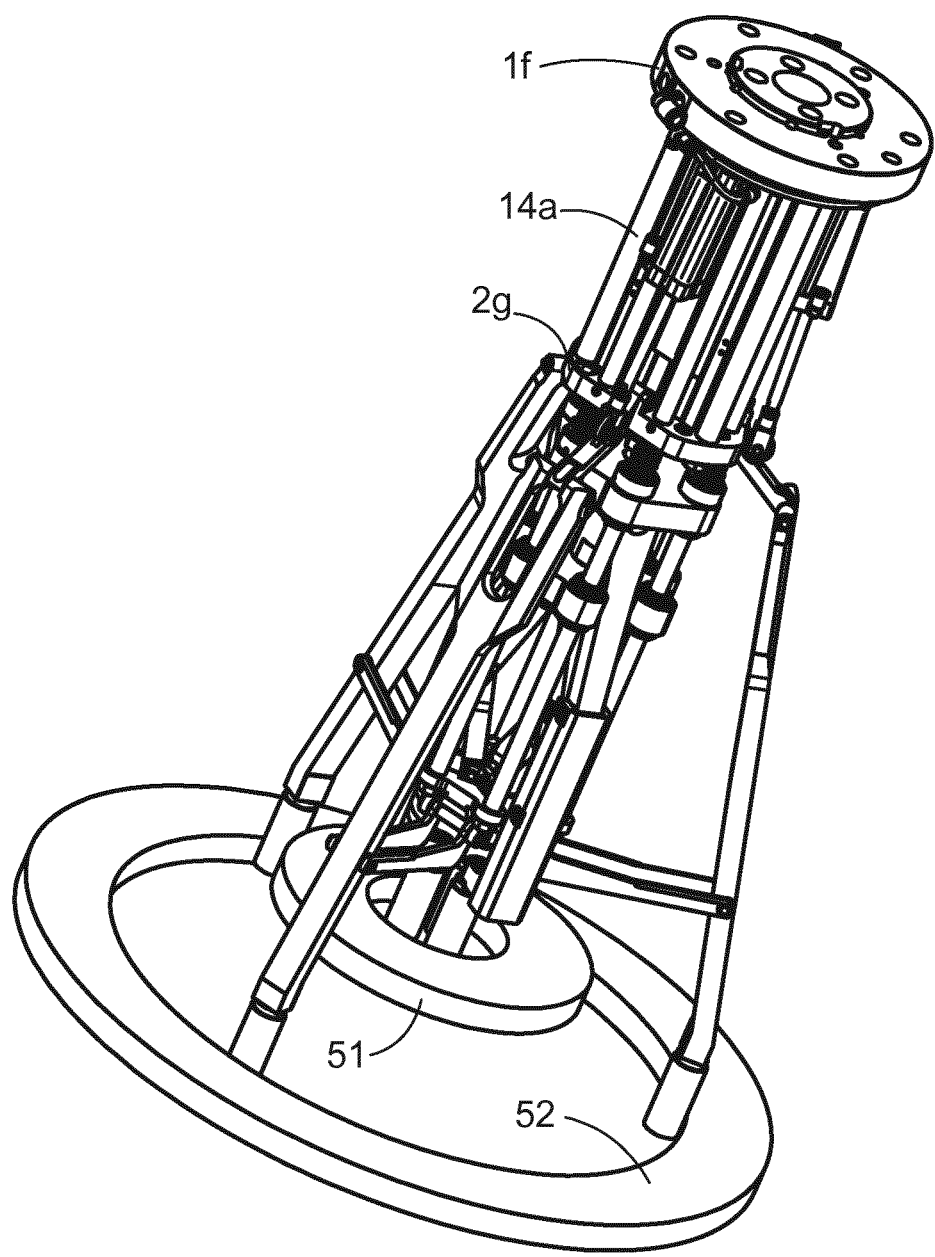
FIG. 20 A version of the long arm gripping mechanism covered by the invention with six finger mechanisms. The first group of three finger mechanisms is retracted, to grasp a part from inside, whereas the second group of three individually operated finger mechanisms is extended, to grasp the same flexible part from outside, or—as shown here—to grasp another part from inside or outside.

FIG. 20 shows the long arm gripping mechanism with two groups of three finger mechanisms each. The first group of mechanisms with parallel and straight finger motion has grasped one ring-shaped object (51) from inside, then transported by means of the robot above a second object (52) somewhat larger, which is grasped by the second group of finger mechanisms from inside or outside (as shown here); both items are transported together to another place.

FIG. 21 shows a procedure similar to FIG. 20, but in this case, the first group of finger mechanisms grasps the smaller object (51) from outside, and the second group moves their gripper top jaws (35) by means of actuators (10d), synchronized by synchronization ring (50).

According to FIG. 22, the gripper tower of the long arm gripping mechanism consists of five cages (I, II, III, IV and V) placed on top of each other. Six guide rods (12), starting from flange plate (1e) pass through the five cages up to the lowest cage plate (3g), traversing all other cage plates. Cage plate (2h) by means of three guide rods (14b) is connected to flange plate (1e). Actuator (10a) is clamped between fixed cage plates (2h and 4d). The gripper tower is reinforced by all of these elements. Two further axially movable cage plates (5d and 6b) are mutually connected by three additional guide rods (15a), forming together a movable cage (II+III+IV). The movable cage is axially moved up and down by means of driving rod (11a) or driving shaft of actuator (10a). This movable cage reinforces the gripper tower as well. Furthermore it acts as driving element for finger, suction or magnetic head mechanisms. The movable cage plates (5d and 6b) and the fixed cage plate (3g) feature fasteners at either or both sides for joints (22a).

According to FIG. 23, an actuator (10 b) with traversing driving rod or shaft (11a and 11b) is placed between the fixed cage plates (2h, 4d). The second half of driving rod or shaft is used for a distance measuring system and/or an emergency stop system, to allow programming of the long arm gripping mechanism, so that the system does not drop the grasped object even in the case of power failure.

In FIG. 24, three very long gripper fingers (34b) are installed to the gripper tower of the long arm gripping mechanism with five cages. The crank (33) is attached to the fixed cage plate (3g), whereas the two links (31 and 32) are located at the cage plates (5d and 6b) of the moving cage. While retracting and closing the finger mechanisms, the gripper fingers (34b) are inserted into the cut outs (23e) of the cage plates between the guide rods, forming together with the trefoil-shaped cage plates a cylindrical body, which disposes a perimeter not exceeding the circumference around the guide rods (12).

In the case of longer gripper fingers (e.g. a length several meters), the movable cage is equipped with several cage plates, to which further links are added, in parallel and analog to the links already present (31 and 32), intended to support the long finger (34*b*) likewise.

According to FIG. 25, the gripper tower of the multi-functional long arm gripping mechanism consists of six cages (I to VI), which form a pyramidal structure, starting with flange plate (1*a*). The cage plates feature cut outs (23*f*) intended to accommodate finger and other mechanisms. Cage plates (5*e* and 6*c*) together with the three guide rods (15*b*) are combined to a cage (III, IV and V) located inside other cages, and axially slidable on guides (14*b* and 14*d*). Actuator (10*a*) operates the movable cage by means of driving rod or shaft (11*a*), which is attached to cage plate (6*c*). Fasteners for joints (22*a*) complete the cage plates for fixed or axially slidable swivel joints.

FIG. 26 shows a finger mechanism in closed state, installed to the gripper tower of long arm gripping mechanism illustrated in FIG. 25. The crank (33) is attached to the upper fastener (22*a*) of the lowest cage plate (3*h*) in hinged configuration. The lower link (32) sits at the lower fastener (22*a*) of the movable cage plate (5*e*), and the upper link (31) is attached to the lower fastener (22*a*) of the movable cage plate (6*c*) in a rotatable manner. The downward motion of the movable cage (III, IV and V) by means of actuator (10*a*) causes the gripper finger to open (34*c*), in opposite direction to close.

According to FIG. 27, the movable cage (III) in illustrations (10 to 21) is formed by the cage rods (12) and movable cage plates (5*c* and 6*a*). The mutual distance of the movable cage plates can be modified by actuator (10*c*). Both cage plates (5*c* and 6*a*) feature holes for attachment of linear bearings (17), which simplify sliding motion on cage rods or ropes, and allow adaptation of bearing axes to axes of cage rods, straight or diagonally, in a certain angle range (a) all around in case of need. Both cage plates (5*c* and 6*a*) feature brackets with joint holes (21*c* and 21*d*) for hinged attachment of links (31 and 32) of finger or other mechanisms.

The cage plates (5*c* and 6*a*) are rotatable with respect to each other and connected to actuator (10*c*) respectively its driving rod or shaft. Linear bearings (17) in their holes are secured against axial displacement by circlips (26).

According to FIG. 28, two or more axially movable cage plates (5*d* and 6*b*) mutually connected by guide rods (15*a*) form an axially movable cage. The cage plates feature holes for insertion of linear bearings (17), and other holes (27) for pass-through of additional guide rods and driving rods or shafts. Cage plate (5*d*) is equipped with a coupling element (28) laterally movable in two directions and rotatable, used for attachment of driving rod or shaft (11*a*) to this cage plate (5*d*), to enable axial movement.

According to FIG. 29, the synchronization ring (50) is composed of three parts, preferably made of plastics with adequate sliding properties like polyamide, and manufactured in a 3D printing process, inserted into each other and together pinned or screwed. It slides by its semi-curvatures (54) over the rods (12 and 14*a*), and features—according to the number of actuators to be synchronized-long holes (53) running radially from the center towards outside. Within, here in form of three double long holes (53) designed, the hinge pins or pivot bolts (41) of the actuator (10*d*) connection with the mechanisms are running. Only in case of need, the synchronization ring (50) is placed from outside onto the cage rods. For this reason, the bearing positions are provided in form of half bearing shells (54) each.

According to FIG. 30, the entire gripper tower of the long arm gripping mechanism is inserted into a slotted tube (8), which is pinned or screwed with the flange plate (1*g*). The fixed cage plates, particularly the lower elements, are supported by the inner wall of the tube, and reinforce additionally to the rods, the rigidity of the gripper tower, due to the rigidity of the tube (8). An end cap (9) closes the open tube and laterally holds in place the last cage plate. The mechanisms of the long arm gripping mechanism come out from their parking position, passing though the slots of the tube, perform their task and reenter into the tube. The entire long arm gripping mechanism is covered by a rubber elastic coating (not illustrated), so that applications in clean rooms, chemical and submarine environment, are possible.

A long arm gripping mechanism designed this way features a slim structure, is multi-functional and particularly appropriate for assembly and handling tasks, as well as for deeply grasping into corners of deep holes, crates and cardboards.

The features detailed in this description, in drawings and claims, may be relevant for the realization of the invention, whether individually or in any combination.

All of the discussed features are essential to the invention.

TERMS AND ASSIGNMENT NUMBERS

Flange, gripper flange, flange plate, flange cage
Fixed and movable cages
Cage plates
Rods, spokes, wires, ropes and strings
Tower, Gripper tower
Actuator, Pneumatic or hydraulic cylinder, electric motor,
Driving rod: piston rod, driving shaft or spindle shaft
Trefoil-shaped
Crank-rocker mechanism: Frame (rod), crank, coupler, swinging link
Slider-crank mechanism: Frame (rod), slider, coupler, crank or swinging link
Gripper, gripper top jaw, gripper finger
Gripping mechanism:
    Finger mechanism
    Suction mechanism
    Magnetic head mechanism
Linear bearing=Slide or roller bearing for linear motion

REFERENCE DESIGNATIONS

1 Flange plate=first cage plate
2 Second fixed cage plate
3 Third fixed cage plate
4 Fourth fixed cage plate
5 Movable cage plate, connected to an actuator
6 Movable cage plate, directly or indirectly connected to an actuator
7 Fixed cage plate
8 Sheathing tube
9 Tube cap
10 Actuator, pneumatic cylinder or electric motor
11 Movable part of actuator, piston rod or spindle shaft
12 Long fixed rod or tube
13 Spoke, wire, rope or string
14 Short fixed rod or tube
15 Movable rod or tube
16 Portion of the rods inserted into cage plates (previously: short-stroke cylinder)

17 Linear bearing
18 Fastening screw
19 The attachment vertical slot or oblong hole of the hub of a fixed cage plate
20 Compressed air connections
21 Milled fasteners for joints at the flange plate (previously: screwing at the flange perimeter)
22 Separate fasteners for joints (previously: screwing below the flange plate)
23 Cut outs of cage plates (previously: brackets below the flange)
24 Compression spring (previously: joint 21*b* at fixed cage plate 2)
25 Protecting cap of linear bearings
26 Circlip (previously: Joint 21*c* at movable cage plate 5*c*)
27 Bore within cage plate 6*b* for driving rod (previously: no. 48)
28 Coupling of driving rod in cage plate 5*d* (previously: Joint 21*d* at movable cage plate 6*a*)
29 Pins or screws (previously: Joint 21*e* at movable cage plate 3*f*)
30 Omitted (previously: joint 21*f* at cage plate 4*a*)
31 Rear link of finger mechanism
32 Frontal link of finger mechanism
33 Crank of finger mechanism
34 Gripper finger of finger mechanism
35 Round gripper top jaw
36 Coupler as suction or magnet arm
37 Swinging link of suction or magnet arm
38 Crank of suction or magnet arm
41 Joint between driving element (11*d*) and crank (38)
42 Joint between crank (38) and coupler (36)
43 Power chain
44 Power supply lines, (vacuum hose)
45 Suction cup
50 Synchronization ring or cage
51 Small ring as grasping object
52 Larger ring as grasping object
53 Radial long hole

The invention claimed is:

1. Gripping mechanism for attachment to robots, machines and handling equipment, comprising one arm and at least one movable gripper finger, acting together in a coordinated manner with another fixed or movable gripper finger:
    the arm comprising a case of said gripping mechanism in the form of a slim and multi-stage tower in sandwich construction, composed of at least two cages above a gripper flange that is a proximal attachment point of the arm, with two fixed cage plates, one of the fixed cage plates being the gripper flange, with the mutual distance between the fixed cage plates being maintained by at least one of rods, spokes, ropes and/or wires,
    wherein at least one actuator and all movable parts of said gripper mechanism are mainly located within said at least two cages, when in retracted state.

2. Gripping mechanism according to claim 1, wherein one or more active and/or passive pressure-generating machine elements are clamped between the cage plates.

3. Gripping mechanism according to claim 2, wherein said one or more active and/or passive pressure-generating machine elements is comprises an actuator.

4. Gripping mechanism according to claim 2, wherein said one or more active and/or passive pressure generating machine elements comprises a screw drive.

5. Gripping mechanism according to claim 2, wherein said one or more active and/or passive pressure generating machine elements comprises a pneumatic cylinder.

6. Gripping mechanism according to claim 2, wherein said one or more active and/or passive pressure generating machine elements comprises a hydraulic cylinder.

7. Gripping mechanism according to claim 2, wherein said one or more active and/or passive pressure-generating machine elements comprise tubes or rods.

8. Gripping mechanism according to claim 1, wherein said cage plates include at least one cut out into which movable elements of finger, suction, magnetic head and/or other mechanisms return during retraction.

9. Gripping mechanism according to claim 1, further including fasteners for joints, wherein said fasteners are located close to the center of the cage plates, intended for attachment of movable components of the mechanisms.

10. Gripping mechanism according to claim 1, wherein a height of said fixed cage plates is adjustable.

11. Gripping mechanism according to claim 1, further comprising at least one movable cage plate that is axially slidable on said rod.

12. Gripping mechanism according to claim 1, wherein said at least one cage is composed of at least two movable cage plates and is axially slidable on said rods.

13. Gripping mechanism according to claim 11, wherein said movable cage plate or a movable cage is used as a drive for gripper fingers, suction or magnet arms or other mechanisms.

14. Gripping mechanism according to claim 11, wherein an axially movable ring or said axially movable cage plate or a slidable cage is used as synchronizing element for the motion of at least two mechanisms.

15. Gripping mechanism according to claim 12, wherein at least one of said movable cage plates or a movable cage is used as a drive for gripper fingers, suction or magnet arms or other mechanisms.

16. Gripping mechanism according to claim 12, wherein an axially movable ring or at least one of the axially movable cage plates or a slidable cage is used as synchronizing element for the motion of at least two mechanisms.

* * * * *